US011219166B2

(12) United States Patent
Desrochers et al.

(10) Patent No.: US 11,219,166 B2
(45) Date of Patent: Jan. 11, 2022

(54) BALE WRAPPING APPARATUS

(71) Applicant: Groupe Anderson Inc., Chesterville (CA)

(72) Inventors: Patrice Desrochers, Chesterville (CA); Jacques Breton, Chesterville (CA); Alexandre Giguere, Chesterville (CA); Michael Gagnon-Bouchard, Chesterville (CA); Raphael Soucy-Gauthier, Chesterville (CA)

(73) Assignee: Groupe Anderson Inc., Chesterville (CA)

( * ) Notice: Subject to any disclaimer, the term of this patent is extended or adjusted under 35 U.S.C. 154(b) by 167 days.

(21) Appl. No.: 16/456,993

(22) Filed: Jun. 28, 2019

(65) Prior Publication Data

US 2020/0000042 A1    Jan. 2, 2020

Related U.S. Application Data

(60) Provisional application No. 62/692,117, filed on Jun. 29, 2018.

(51) Int. Cl.
*A01F 15/07* (2006.01)
*B65B 11/00* (2006.01)
*A01F 25/14* (2006.01)

(52) U.S. Cl.
CPC .......... *A01F 15/071* (2013.01); *B65B 11/008* (2013.01); *A01F 2015/0735* (2013.01); *A01F 2025/142* (2013.01)

(58) Field of Classification Search
CPC ............ A01F 15/071; A01F 2015/0735; A01F 2025/142; B65B 11/008; B65B 2210/16

(Continued)

(56) References Cited

U.S. PATENT DOCUMENTS 4,793,124 A * 12/1988 Anderson ............. A01F 15/071
53/556
5,012,631 A *  5/1991 Hostetler et al. ..... A01F 15/071
53/556

(Continued)

FOREIGN PATENT DOCUMENTS

CA        2628502 A1 * 10/2009 ........... A01F 15/071
CA        2754659 A1 *  4/2013 ............. A01F 25/14

(Continued)

OTHER PUBLICATIONS

Tube-Line Manufacturing Inc., Tube-Line 6500X2 Owner's Manual, 2007, pp. 1-80, Listowel, Ontario Canada.†

*Primary Examiner* — Stephen F. Gerrity
(74) *Attorney, Agent, or Firm* — Andrus Intellectual Property Law, LLP

(57) ABSTRACT

A bale wrapping apparatus configurable between a single bale wrapping configuration and an inline bale wrapping configuration. The bale wrapping apparatus comprises a bale wrapping support assembly including support rollers spaced apart from one another to drive a bale in rotation along a rotation axis, when the bale wrapping apparatus is configured in the single bale wrapping configuration; and a longitudinal bale support configurable between an extended configuration where it extends above the support rollers and a retracted configuration where it extends away from the support rollers. The longitudinal bale support is positioned in the retracted configuration when the bale wrapping apparatus is configured in the single bale wrapping configuration and is configured in the extended configuration when the bale wrapping apparatus is configured in the inline bale wrapping configuration.

18 Claims, 20 Drawing Sheets

(58) Field of Classification Search
USPC .................................. 53/587, 588, 210, 211
See application file for complete search history.

(56) References Cited

U.S. PATENT DOCUMENTS

| | | | | |
|---|---|---|---|---|
| 5,727,359 A * | 3/1998 | Rampp | ................ | A01F 15/071 53/211 |
| 6,070,400 A * | 6/2000 | Peeters et al. | ........ | A01F 15/071 53/588 |
| 6,082,076 A † | 7/2000 | Anderson | | |
| 2004/0250702 A1 * | 12/2004 | McHale et al. | ....... | A01F 15/071 100/87 |
| 2012/0180430 A1 * | 7/2012 | Lavoie et al. | ........ | B65B 11/008 53/203 |
| 2015/0245563 A1 * | 9/2015 | Heaney et al. | ....... | A01F 15/071 53/52 |

FOREIGN PATENT DOCUMENTS

| | | | | | |
|---|---|---|---|---|---|
| GB | 2394932 A | † | 5/2004 | | |
| WO | WO-9307059 A1 | * | 4/1993 | .......... | A01F 15/071 |
| WO | 2014030150 A | † | 2/2014 | | |
| WO | WO-2017111632 A1 | * | 6/2017 | ............. | A01F 25/14 |

\* cited by examiner
† cited by third party

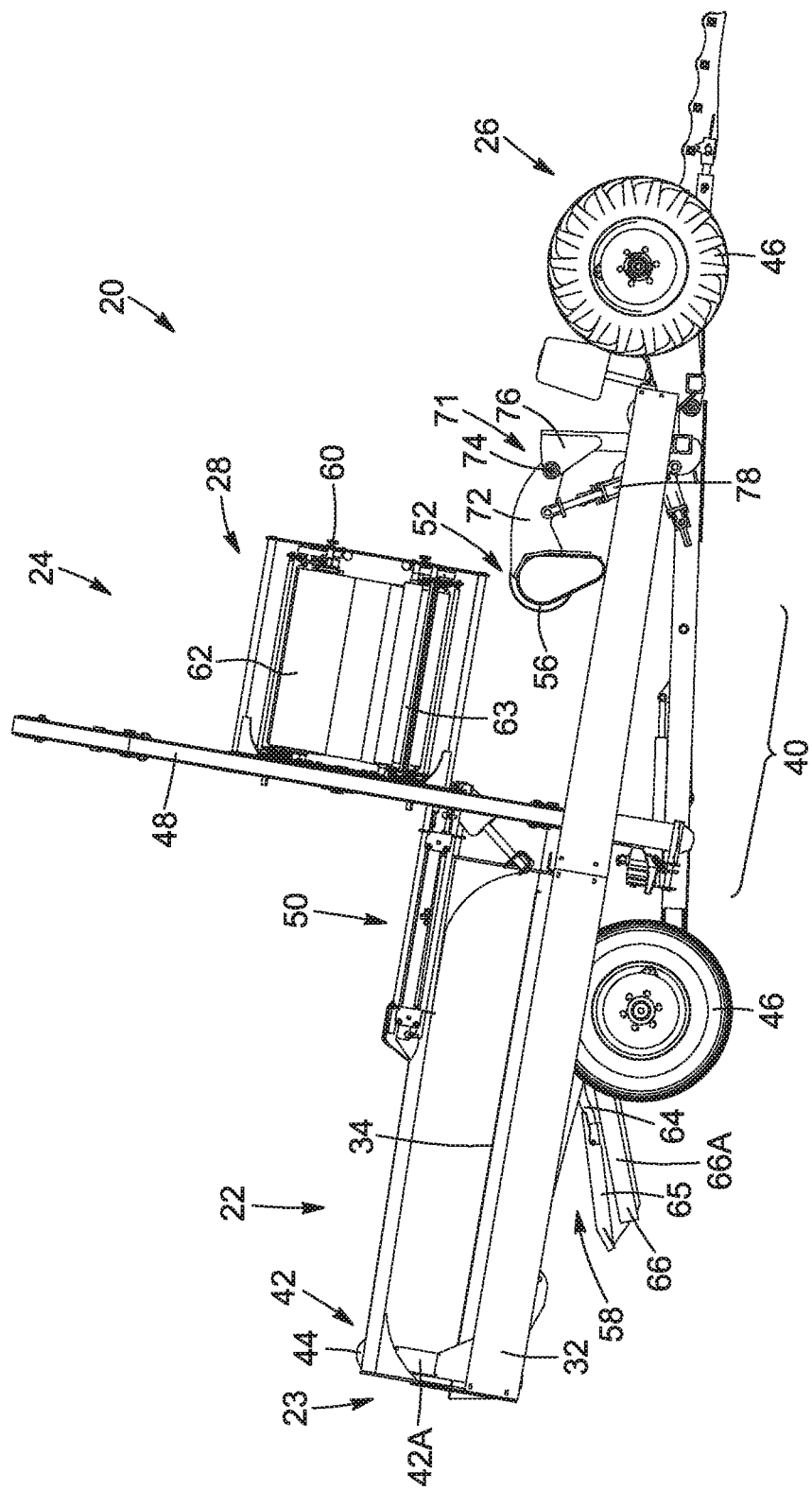

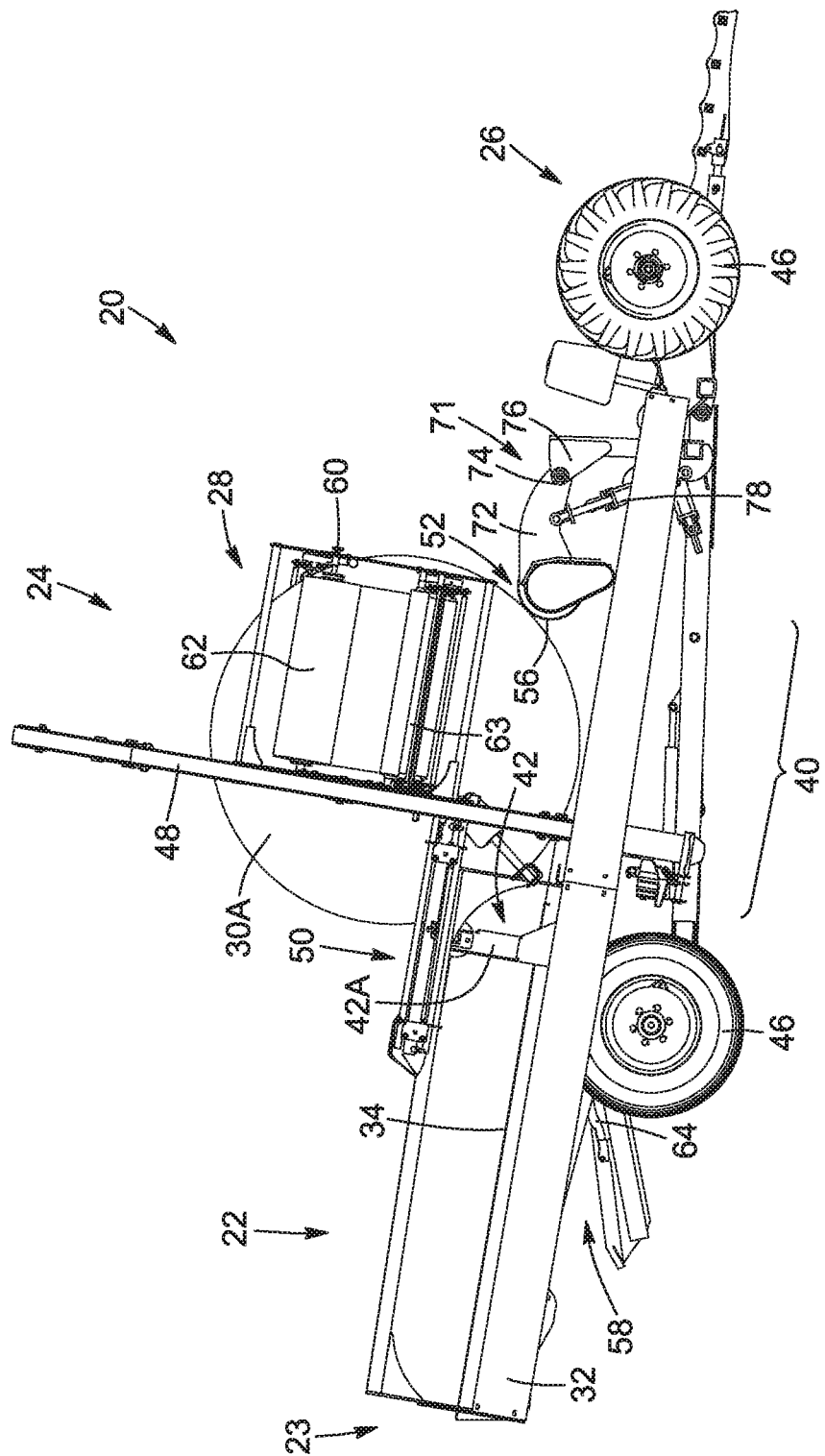

BALE WRAPPING APPARATUS

CROSS-REFERENCE TO RELATED APPLICATIONS

This application claims priority under 35 USC§ 119(e) of U.S. Provisional Patent Application 62/692,117 filed on Jun. 29, 2018, the specification of which is hereby incorporated by reference.

TECHNICAL FIELD OF THE INVENTION

The present invention relates to the field of bale wrapping. More specifically, it relates to a bale wrapping apparatus that allows the inline wrapping of multiple bales (i.e. multiple bales being successively wrapped as a single tube of bales) and the individual wrapping of bales (wrapping of each single bale as an individually wrapped bale).

BACKGROUND

In the agricultural field, crop such as, for example and without being limitative hay, straw, corn straw or the like, is typically shaped in bales for handling and storage. The baled material is commonly subsequently wrapped in wrapping film such as a plastic film, for example in order to eventually turn the crop into fodder. According to different factors such as, for example and without being limitative, the production needs of the farmers, the storage space, individual preferences, etc., the bales can be wrapped individually or as a tube containing multiple bales continuously wrapped together.

Apparatus which can wrap bales individually or inline (i.e. together in a tube) are known in the art. Known agricultural machinery dedicated to bale wrapping and which can perform individual bale wrapping and inline bale wrapping however tend to suffer from several drawbacks. For example and without being limitative, known wrappers which allow the wrapping of bales in either a tube (inline wrapping) or individually (individual wrapping), commonly lack optimal support to the bales while the bale is positioned in a bale wrapping section thereof, for wrapping of the bale, especially when configured in the inline bale wrapping configuration.

In view of the above, there is a need for an improved bale wrapping apparatus which, by virtue of its design and components, would be able to overcome or at least minimize some of the above-discussed prior art concerns.

BRIEF SUMMARY OF THE INVENTION

In accordance with a first general aspect, there is provided a bale wrapping apparatus having a longitudinal axis and being configurable between a single bale wrapping configuration and an inline bale wrapping configuration. The bale wrapping apparatus comprises a bale loading support structure; a bale unloading support structure positioned downstream of the bale loading support structure along the longitudinal axis; and a bale wrapping mechanism positioned in a wrapping section located between the bale loading support structure and the bale unloading support structure. The bale wrapping mechanism has a rotation axis substantially perpendicular to the longitudinal axis and comprises: a frame extending substantially perpendicularly to the longitudinal axis; a film-carrying device operatively mounted to the frame and movable therealong to be drivable around a bale positioned in the wrapping section; and a bale wrapping support assembly extending at least partially along the wrapping section. The bale wrapping support assembly comprises: support rollers extending substantially perpendicularly to the longitudinal axis and spaced apart from one another, the support rollers being fully engageable with the bale positioned in the wrapping section to drive the bale in rotation along the rotation axis, when the bale wrapping apparatus is configured in the single bale wrapping configuration; and a longitudinal bale support engageable with the bale positioned in the wrapping section to support the bale above the support rollers when the bale wrapping apparatus is configured in the inline bale wrapping configuration, the longitudinal bale support being movable in an extended configuration at least partially preventing engagement between the support rollers and the bale positioned in the wrapping section when the bale wrapping apparatus is configured in the inline bale wrapping configuration and in a retracted configuration allowing full engagement between the support rollers and the bale positioned in the wrapping section when the bale wrapping apparatus is configured in the single bale wrapping configuration.

In accordance with another general aspect, there is also provided a bale wrapping apparatus having a longitudinal axis and being configurable between a single bale wrapping configuration and an inline bale wrapping configuration. The bale wrapping apparatus comprises: a chassis; a bale loading support structure mounted to the chassis for receiving unwrapped bales; a bale wrapping mechanism positioned in a wrapping section located downstream of the bale loading support structure along the longitudinal axis and adjacent thereto. The bale wrapping mechanism comprises: an annular frame extending substantially perpendicularly to the longitudinal axis; a film-carrying device operatively mounted to the annular frame and movable therealong to be drivable around a bale positioned in the wrapping section; and a bale wrapping support assembly. The bale wrapping support assembly comprises: support rollers extending substantially perpendicularly to the longitudinal axis and spaced apart from one another therealong to drive the bale in rotation along a rotation axis extending perpendicular to the longitudinal axis, when the bale wrapping apparatus is configured in the single bale wrapping configuration; and a longitudinal bale support configurable between an extended configuration where the longitudinal bale support extends along at least a portion of the wrapping section above the support rollers and a retracted configuration wherein the longitudinal bale support extends away from the wrapping section. The longitudinal bale support is positioned in the retracted configuration when the bale wrapping apparatus is configured in the single bale wrapping configuration and is configured in the extended configuration when the bale wrapping apparatus is configured in the inline bale wrapping configuration. The apparatus further comprises a bale unloading support structure mounted to the chassis downstream of the wrapping section along the longitudinal axis and adjacent thereto for receiving wrapped bales from the bale wrapping mechanism.

In an embodiment, the support rollers comprise at least an upstream support roller and a downstream support roller.

In an embodiment, at least one of the upstream support roller and the downstream support roller is powered.

In an embodiment, the upstream support roller is selectively movable between a lowered position and a raised position.

In an embodiment, the downstream support roller is selectively pivotable between a lowered position and a raised position.

In an embodiment, the bale wrapping support assembly further comprises an intermediate support roller movable between a lowered configuration where it is disengaged from a peripheral surface of the bale and a raised configuration where it is engaged with the peripheral surface of the bale between the upstream support roller and the downstream support roller.

In an embodiment, the longitudinal bale support comprises at least two elongated members extending longitudinally along the longitudinal axis.

In an embodiment, the at least two elongated members are pivotable between an inclined orientation and a substantially horizontal orientation. The at least two elongated members are positioned in the substantially horizontal orientation when the bale wrapping apparatus is configured in the inline bale wrapping configuration and are positioned in the inclined orientation when the bale wrapping apparatus is configured in the single bale wrapping configuration.

In an embodiment, the bale loading support structure comprises a bale biasing member movable substantially parallel to the longitudinal axis to push a bale towards the wrapping section.

In an embodiment, the bale biasing member comprises a roller extending substantially transversally with respect to the longitudinal axis, the roller being rotatable and engageable with the bale to drive the bale in rotation towards the wrapping section when the bale wrapping apparatus is configured in the single bale wrapping configuration.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 3A to 3G are views of the bale wrapping apparatus of FIG. 1 configured in the inline bale wrapping configuration and showing a sequence of operation for the wrapping of multiple bales in a single tube, wherein:

FIG. 3A is a left side elevation view of the wrapping apparatus before a first bale is received;

FIG. 3B is a left side elevation view of the wrapping apparatus with the first bale loaded on the bale loading support structure of the apparatus;

FIGS. 3C and 3D are respectively a left side elevation view and a front elevation view of the wrapping apparatus with the first bale in a wrapping section and being wrapped by a bale wrapping mechanism;

FIG. 3E is a left side elevation view of the wrapping apparatus with a second bale loaded on the bale loading support structure, while the first bale is being wrapped;

FIG. 3F is a left side elevation view of the wrapping apparatus with the second bale positioned in the wrapping section and being wrapped along with the first bale in a single tube; and FIG. 3G is a left side elevation view of the wrapping apparatus with multiple bales wrapped in a single tube.

FIGS. 4A to 4K are views of the bale wrapping apparatus of FIG. 1 configured in the single bale wrapping configuration and showing a sequence of operation for the wrapping of a single bale, wherein:

FIG. 4A is a left side elevation view of the wrapping apparatus before the bale is received;

FIG. 4B is a left side elevation view of the wrapping apparatus with the bale loaded on the bale loading support structure of the apparatus;

FIG. 4C is a left side elevation view of the wrapping apparatus with the bale moved to the wrapping section;

FIGS. 4D and 4E are left side elevation views of the wrapping apparatus with the bale positioned in the wrapping section during the beginning of the wrapping process;

FIGS. 4F and 4G are respectively a front elevation view and a left side elevation view of the wrapping apparatus with the bale positioned in the wrapping section and further along the wrapping process;

FIG. 4H is a left side elevation view of the wrapping apparatus with the bale positioned in the wrapping section and the wrapping film being cut to release the bale; and FIGS. 4I to 4K are left side elevation views of the wrapping apparatus with the bales being successively moved from the bale wrapping section and towards the ground.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present description are embodiments only, given solely for exemplification purposes.

Moreover, although the embodiments of the bale wrapping apparatus and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the bale wrapping apparatus, as will be briefly explained herein and as can be easily inferred herefrom by a person skilled in the art. It will also be appreciated that positional descriptions such as "downstream", "upstream", "above", "below", "left", "right" and the like should, unless otherwise indicated, be taken in the context of the figures and correspond to the position and orientation of the bale wrapping apparatus and corresponding parts shown in the Figures, with "upstream" corresponding to a position closer to a bale loading support structure of the bale wrapping apparatus and "downstream" corresponding to a position closer to a bale unloading support structure of the bale wrapping apparatus. Positional descriptions should not be considered limiting.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Figure 1:
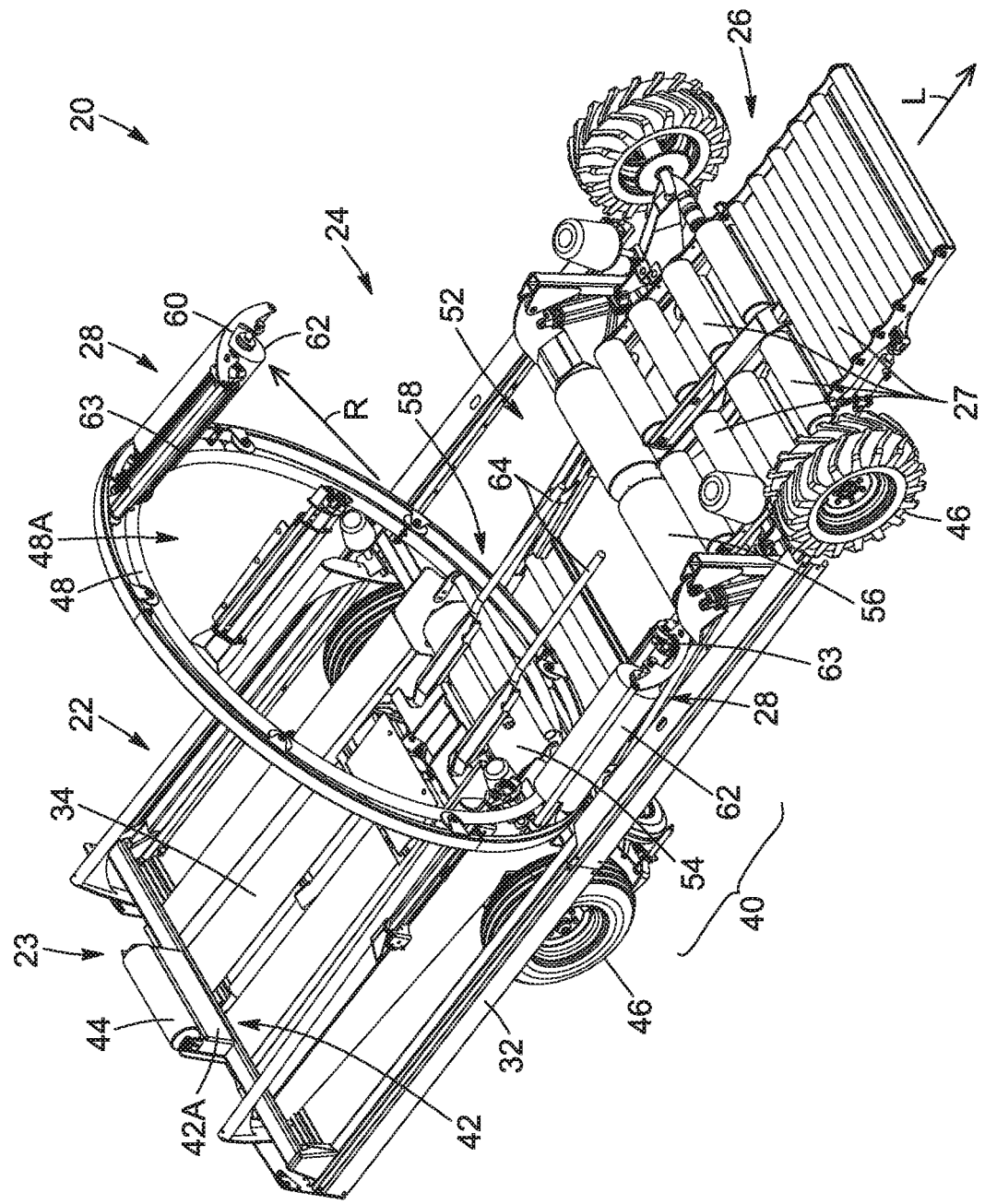
FIG. 1 is an isometric view of a bale wrapping apparatus configured in an inline bale wrapping configuration, with a longitudinal bale support configured in an extended configuration, according to an embodiment.
Figure 2:
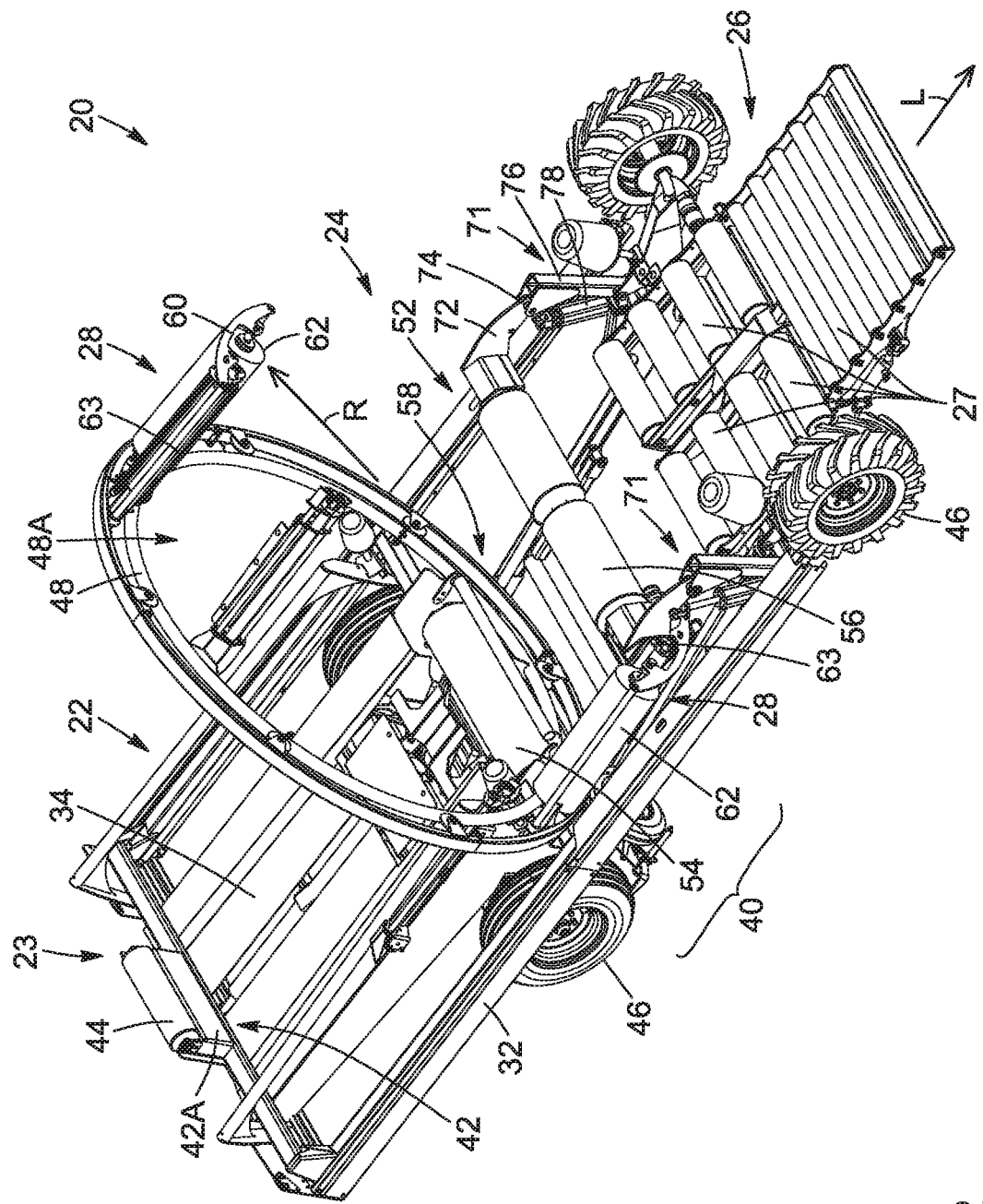
FIG. 2 is an isometric view of the bale wrapping apparatus of FIG. 1 configured in a single bale wrapping configuration, with the longitudinal bale support configured in a retracted configuration.

Referring to FIGS. 1 and 2, there is shown an embodiment of a bale wrapping apparatus 20 for wrapping bales of crop such as, for example and without being limitative, hay, haylage, straw, corn straw, etc. or any combination thereof. The bales usually have a cylindrical shape or a square shape and are wrapped with plastic film to promote, for instance, fermentation in the production of fodder or silage. In the agricultural field, bales are typically wrapped individually or inline (i.e. in a tube of multiple bales). In the case of individual wrapping of cylindrical bales, the bales are individually wrapped on their rounded peripheral surface and on their substantially flat ends. In the case of inline wrapping (i.e. multiple wrapping), multiple bales are successively wrapped on their rounded peripheral surface. The substantially flat ends of the first and last bales of the tube which define the extremities of the tube of successive bales can also be wrapped to ensure sealing of the tube and prevent spoilage of the fodder. One skilled in the art will understand that, wrapping of the substantially flat ends of the first and last bales of the tube which define the extremities of the tube can be performed before or after the inline wrapping described below and will not be described in detail herein. The tubes may have various lengths according to the number of bales wrapped, no specific limitations being created by the apparatus for the number of successive bales that can be wrapped in the inline bale wrapping configuration.

As will be easily understood by one skilled in the art, the bale wrapping apparatus described herein is presented as an apparatus designed for wrapping bales, but it could also be used to wrap other objects such as and without being limitative boxes, packages, bundles of items or the like.

Referring more specifically to FIGS. 1 and 2, as will be better understood in view of the description below, the bale wrapping apparatus 20 is configurable between an inline bale wrapping configuration (see FIG. 1) and a single bale wrapping configuration (see FIG. 2). When configured in the inline bale wrapping configuration as shown on FIG. 1, the bale wrapping apparatus 20 is configured to receive bales (which can have a shape other than rounded) in a longitudinal orientation (i.e. to receive the bales in an orientation where they are longitudinally substantially parallel to a longitudinal axis L). In opposition, when configured in the single bale wrapping configuration, as shown on FIG. 2, the bale wrapping apparatus 20 is configured to receive rounded bales in a crosswise orientation (i.e. to receive the bales in an orientation where they are longitudinally substantially perpendicular to the longitudinal axis L. In the single bale wrapping configuration, the bale wrapping apparatus 20 is configured to wrap rounded bales (i.e. bales having a rounded peripheral surface) as it requires rotation of the bale on support rollers during wrapping, as will be described in more details below.

In the embodiment shown, the bale wrapping apparatus 20 comprises a bale loading support structure 22, a bale wrapping mechanism 24 and a bale unloading support structure 26 positioned successively along the longitudinal axis L of the bale wrapping apparatus 20. In the embodiment shown, the bale wrapping apparatus 20 also comprises a chassis 32 onto which the bale loading support structure 22, the bale wrapping mechanism 24 and the bale unloading support structure 26 are mounted.

In the embodiment shown, the chassis 32, and therefore, the bale loading support structure 22 and the bale unloading support structure 26, are inclined towards a ground surface, with the bale loading support structure 22 being positioned upwards with regards to the bale unloading support structure 26. However, it can be appreciated that in an alternative embodiment (now shown), the bale loading support structure 22 and the bale unloading support structure 26 could present a different configuration (or relative position) regarding one another.

The bale loading support structure 22 comprises a receiving end 23 and is sized shaped and configured to receive unwrapped bales. In the embodiment shown, the bale loading support structure 22 has a rectangular profile and comprises a floor surface 34. In the embodiment shown, the floor surface 34 is a substantially flat surface but it can be appreciated that, in an alternative embodiment (not shown), the floor surface 34 could comprise, for instance, a recessed portion for receiving the bale, or could have a different configuration, such as, for instance and rounded configuration.

In the embodiment shown, the bale loading support structure 22 also comprises a bale biasing member 42 (or pusher) movable longitudinally along the bale loading support structure 22 (i.e. movable in a direction substantially parallel to the longitudinal axis L) to push an unwrapped bale towards the wrapping section 40. In the embodiment shown, the bale biasing member 42 has a bale engaging member 42a extending upwardly and engageable to a rear surface of a bale when the bale is being driven towards the wrapping section 40.

In an embodiment, the bale engaging member 42a includes a free rolling roller 44 engageable with a bale when the bale biasing member 42 is moved longitudinally to drive the bale towards the wrapping section 40. The roller 44 extends substantially transversally with respect to the longitudinal axis L. The roller 44 is engageable with each unwrapped bale being driven towards the wrapping section 40 by the action of the bale biasing member 42. The roller 44 is rotatable to reduce friction when the bale engaging member 42a is engaged with an unwrapped bale being driven towards the wrapping section 40 by the action of the bale biasing member 42 (especially when the apparatus 20 is configured in the single bale wrapping configuration, with the bales positioned in a crosswise orientation). The roller 44 rotates about an axis perpendicular to the longitudinal axis L when the roller 44 is moved from the receiving end 23 of the bale loading support structure 22 towards the wrapping section 40 by movement of the bale biasing member 42. One skilled in the art will understand that, in alternative embodiments (not shown), the roller 44 could have a shape different than a cylinder and/or could be mounted, for instance, on a different section of the bale engaging member 42a.

One skilled in the art will understand that, in an embodiment the bale biasing member 42 can be actuated by a linear actuator (not shown) such as, for example and without being limitative a hydraulic cylinder. One skilled in the art will however understand that, in alternative embodiments, other linear actuator types such as a linear actuator with a pneumatic actuator, a lead-screw actuator, a vacuum actuator or the like could be used to actuate the bale biasing member 42. One skilled in the art will also understand that, in other alternative embodiments (not shown), a bale biasing member 42 operative to push the bales towards a wrapping section 40, but having a different configuration than the one described herein and shown in the appended Figures could be provided. For example and without being limitative, an actuator mounted to the receiving end 23 and upwardly spaced apart from the floor surface 34 could be provided.

The bale wrapping mechanism 24 is positioned in the wrapping section 40 defined between the bale loading support structure 22 and the bale unloading support structure 26 along the longitudinal axis L of the bale wrapping apparatus 20. The bale wrapping mechanism 24 has a rotation axis R substantially perpendicular to the longitudinal axis L. The bale wrapping mechanism 24 includes a frame 48, a film-carrying device 28 drivable onto the frame to rotate around a bale and a bale wrapping support assembly 52.

The frame 48 (or hoop), is mounted to the chassis 32 of the bale wrapping apparatus 20 and extends perpendicularly to the longitudinal axis L, between the lateral portions of the chassis 32. In the embodiment shown, the frame 48 is adjacent to a downstream portion of the floor surface 34 of the bale loading support structure 22. The frame 48 has a void middle section 48a and is shaped and sized to receive a bale positioned in the wrapping section 40, in the void middle section 48 thereof, with the frame 48 surrounding a section of the bale positioned in the wrapping section 40. In the embodiment shown, the frame 48 has an annular shape. In the course of the present description, the term "annular" is used to refer to a shape defining a ring around a center void and which can have a circular shape or a non-circular shape (e.g. hexagonal shape, octagonal shape, square shape) with rounded corners, to allow a smooth movement of the film-carrying device 28 around a bale. The film-carrying device 28 is operatively mounted to the frame 48 and is movable along the frame 48 to be driven around a bale positioned in the wrapping section 40. Therefore, it can be appreciated that the frame 48 may have any appropriate size and shape which allows the film-carrying device 28 to dispense film around a bale. In order to dispense film, the film-carrying device 28 comprises a spool holder 60 for rotatably mounting a spool 62 of wrapping film. In an embodiment, the film-carrying device 28 also includes a tensioner 63 for tensioning the wrapping film being dispensed and wrapping around a bale as the film-carrying device 28 is driven around the bale. In an embodiment the frame 48 extends substantially perpendicular with respect to the floor surface 34.

In the embodiment shown, the bale wrapping mechanism 24 also includes a film cutting mechanism 50 positioned adjacent to the frame 48. The film cutting mechanism 50 is configured to momentarily pinch a section of wrapping film dispensed by the film-carrying device 28 and press the section of wrapping film against a cutting element, to cut the film, once wrapping of the single bale or the multiple bales has been performed.

Referring to FIGS. 1 to 4D, the bale wrapping support assembly 52 of the bale wrapping mechanism 24 comprises an upstream support roller 54 and a downstream support roller 56 extending substantially perpendicularly to the longitudinal axis L and spaced apart from one another. As will be described in more details below, when the bale wrapping apparatus 20 is configured in the single bale wrapping configuration (see FIG. 2), the support rollers 54, 56 are configured to engage with a bale 30A positioned in the wrapping section 40 (see for example FIG. 4D) for rotation of the bale 30A about the rotation axis R while the film-carrying device 28 rotates around the longitudinal axis L. The support rollers 54, 56 are positioned adjacent and downstream of the bale loading support structure 22 and vertically aligned with the frame 48 of the bale wrapping mechanism 24 (i.e. extending substantially parallel to the frame 48 of the bale wrapping mechanism 24 and the rotation axis R). In the embodiment shown, the support rollers 54, 56 are positioned on opposed sides of the frame 48 of the bale wrapping mechanism 24.

Figure 4B:
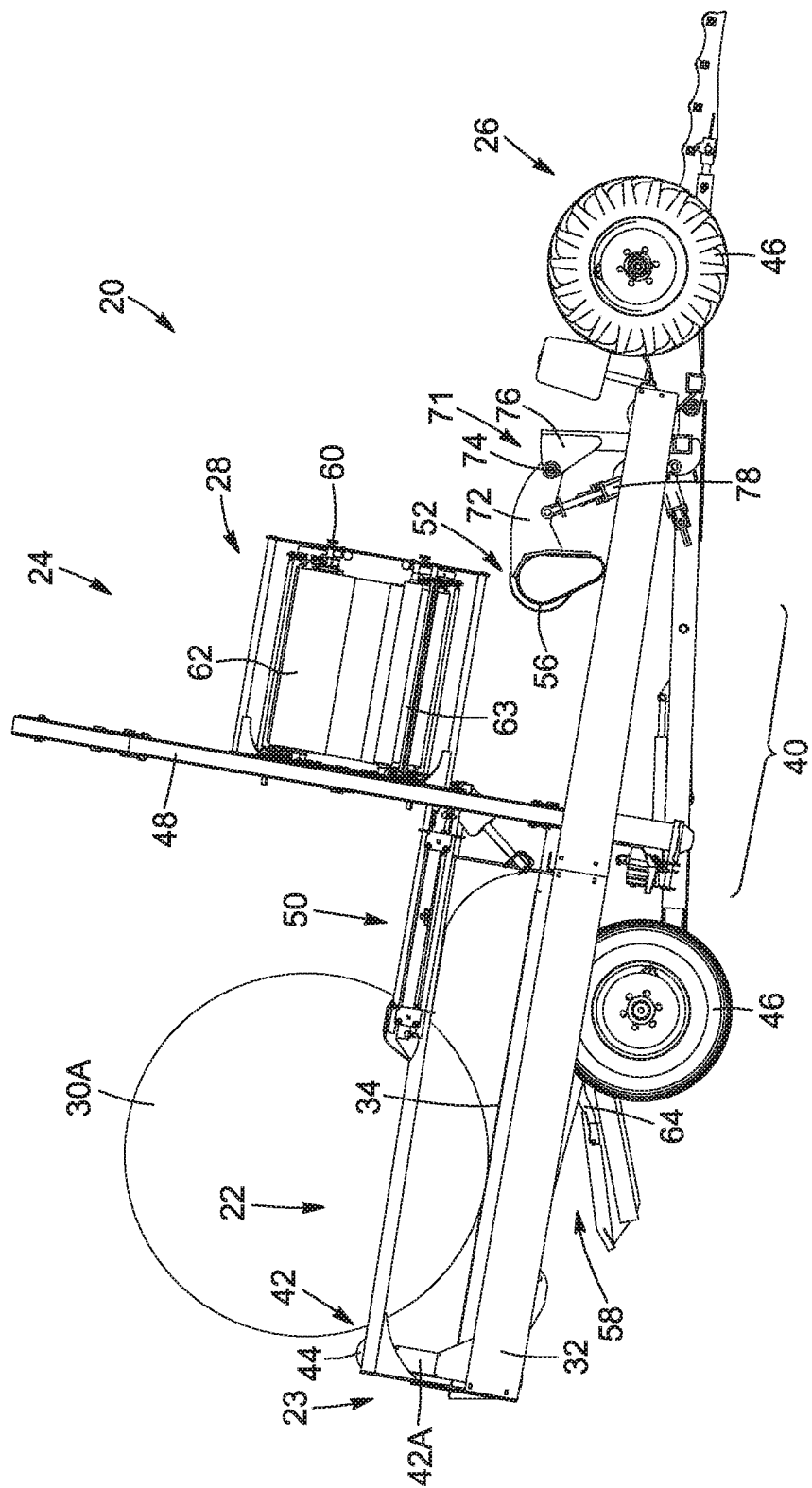
Figure 4D:
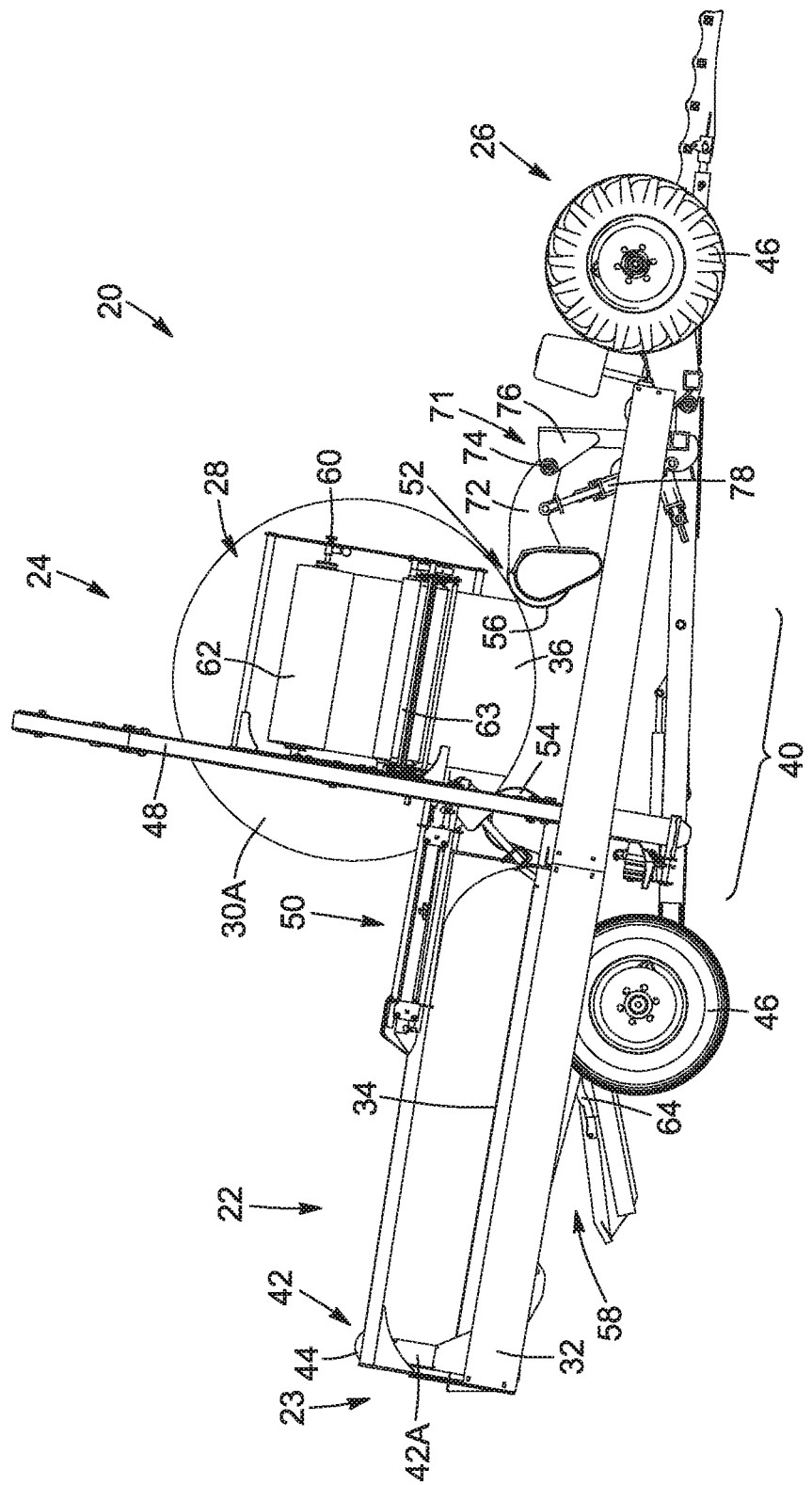
Figure 4E:
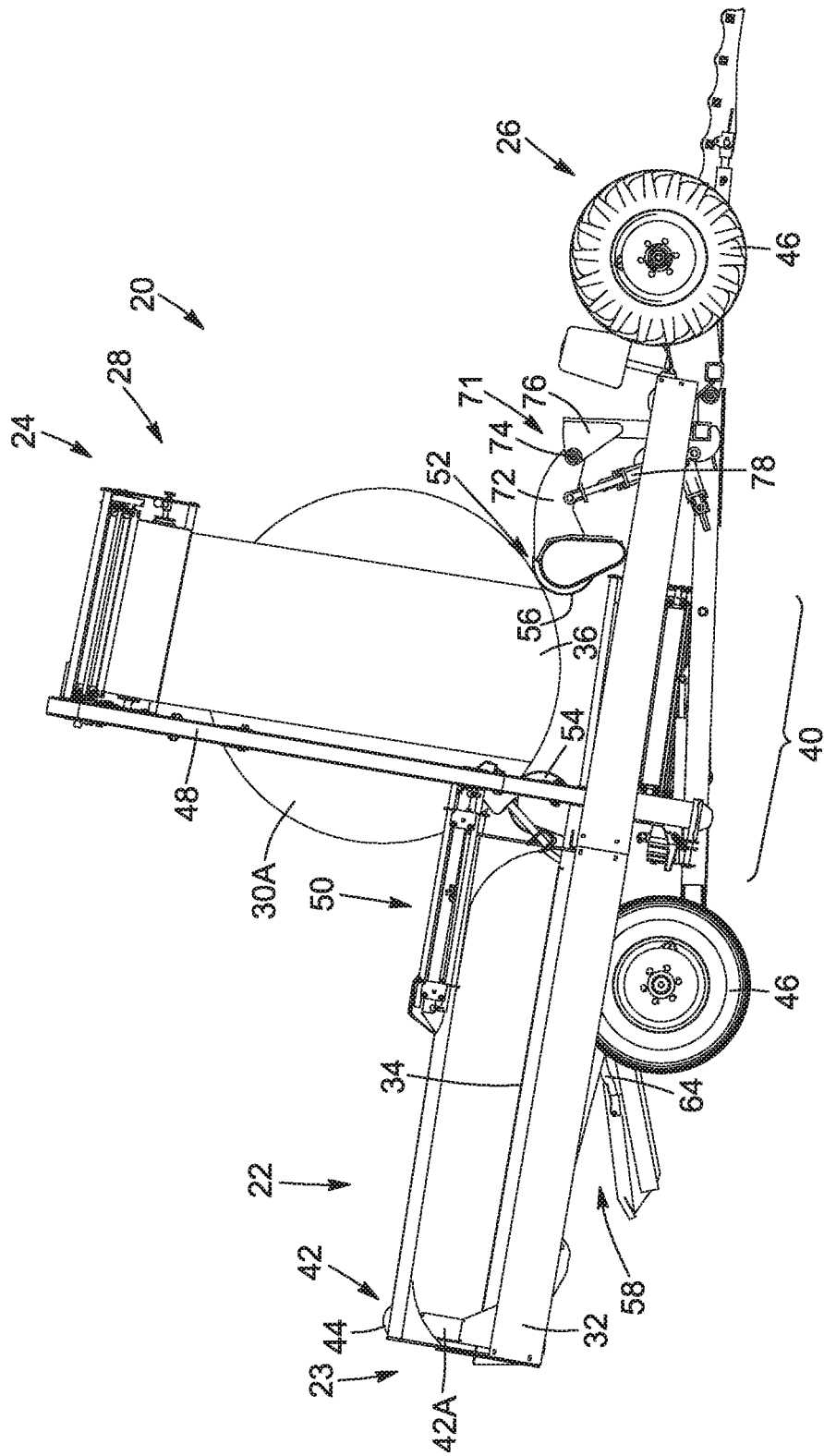
Figure 4F:
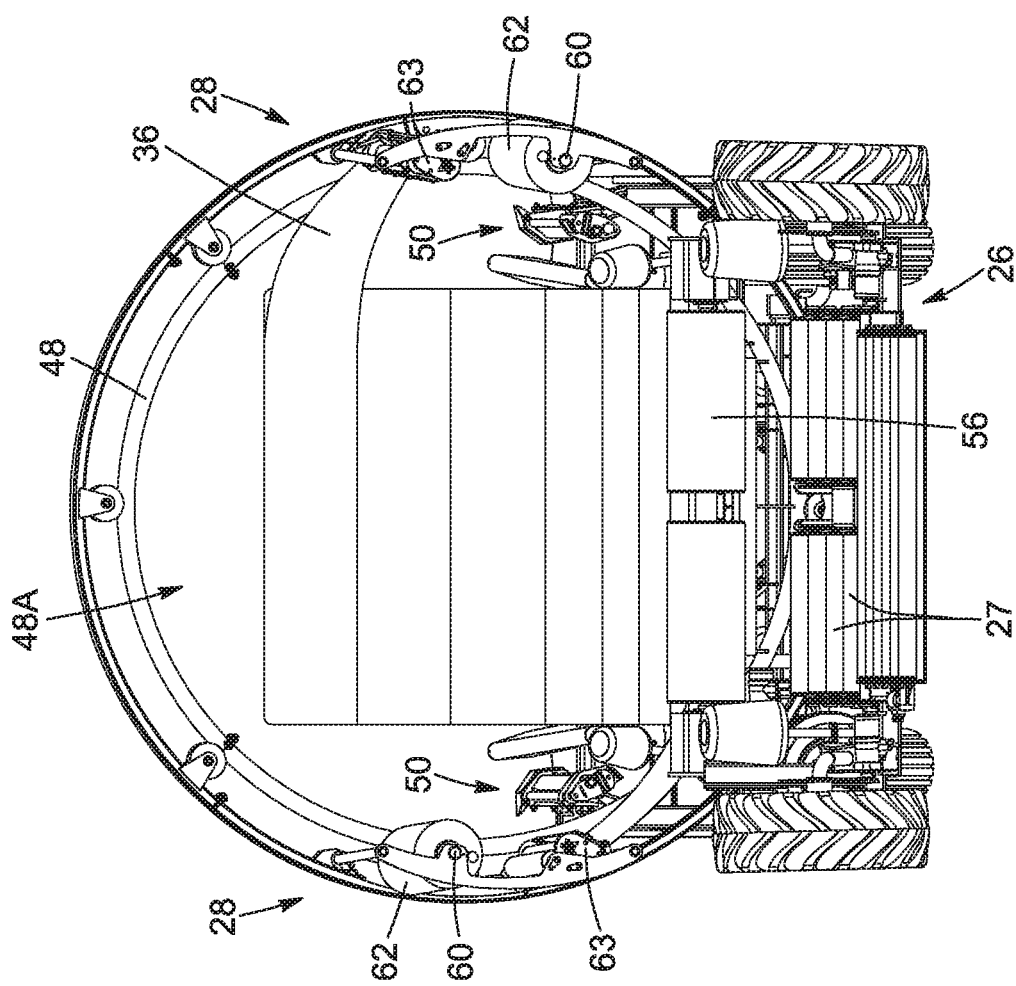
Figure 4G:
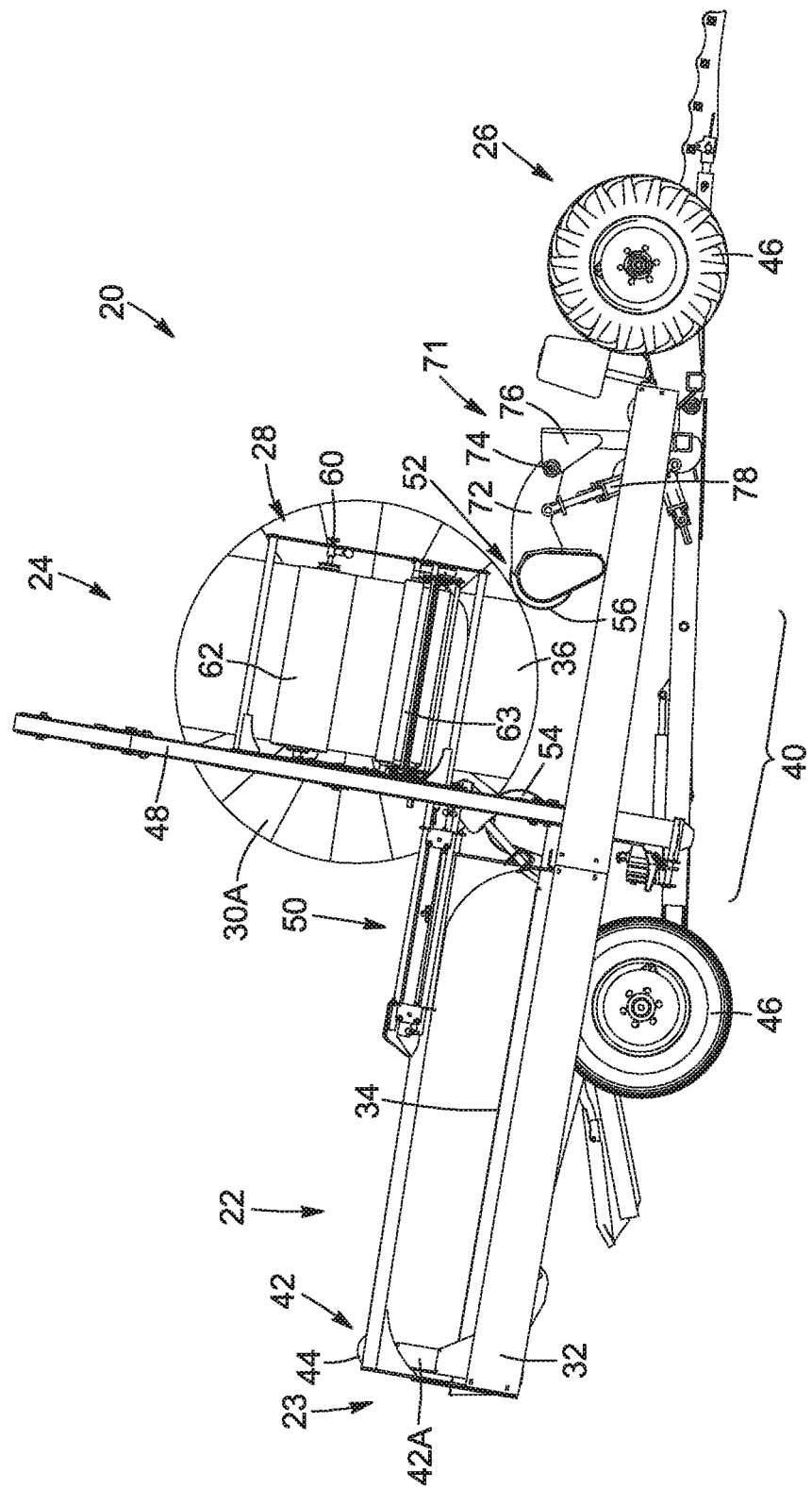
Figure 4H:
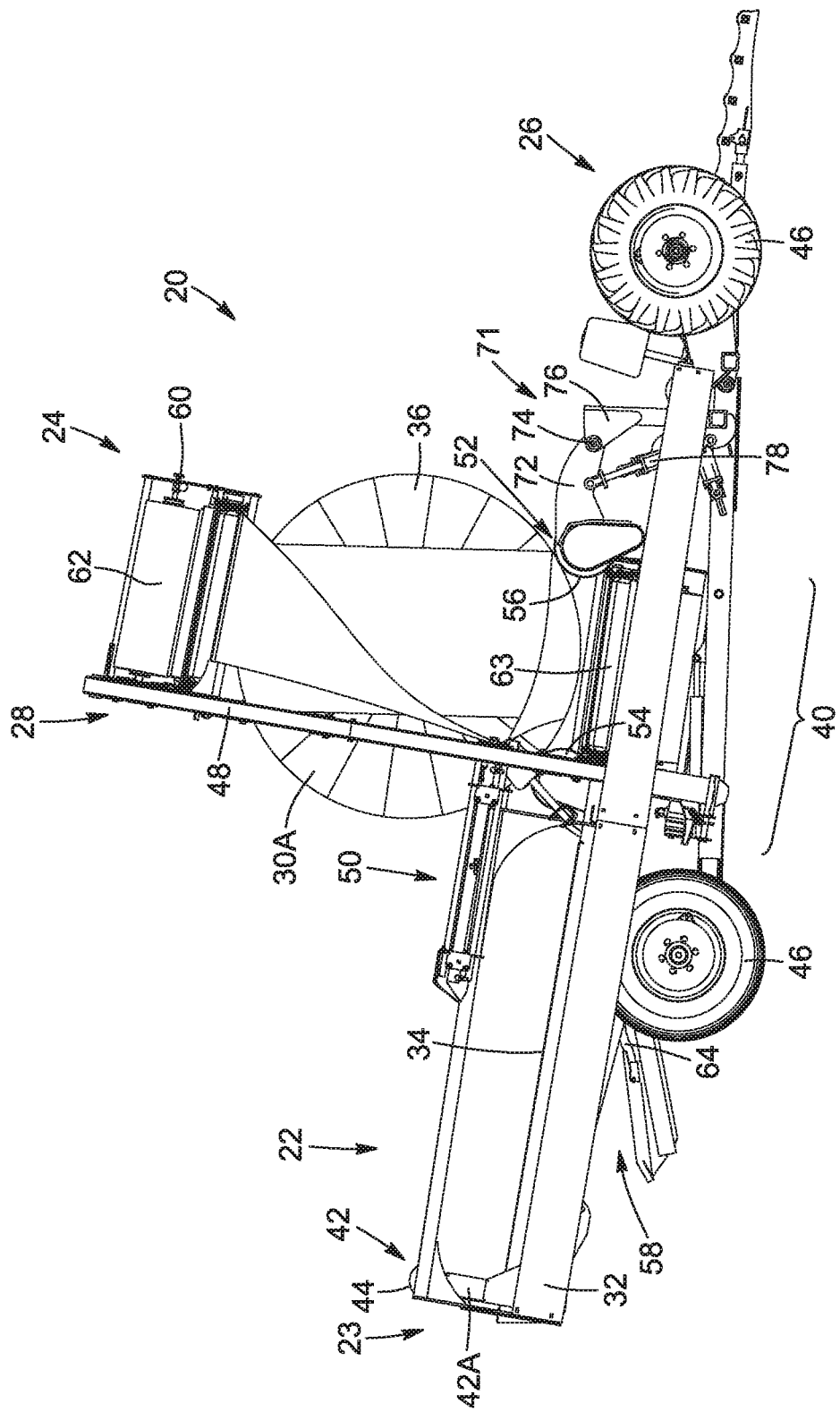
Figure 4I:
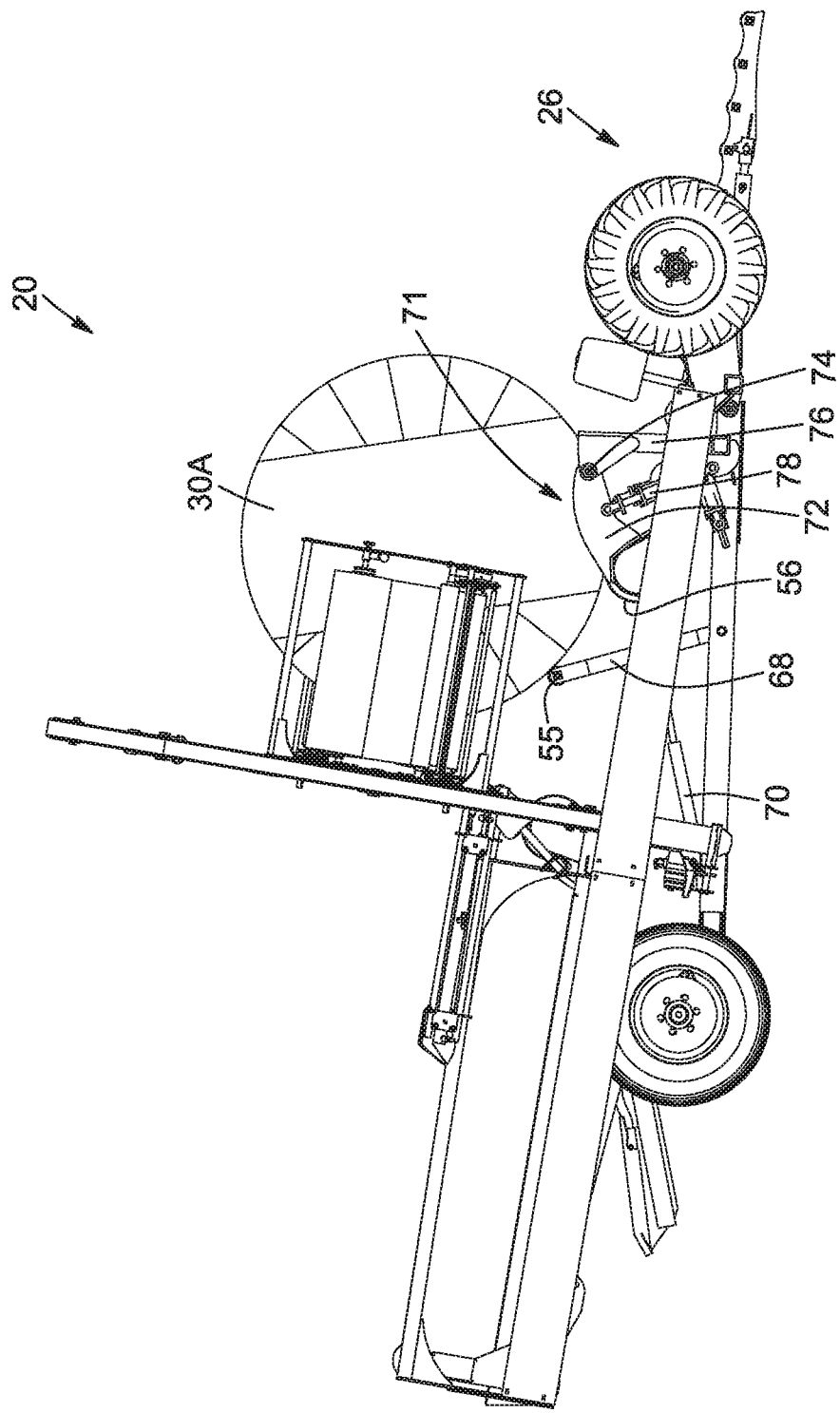
Figure 4J:
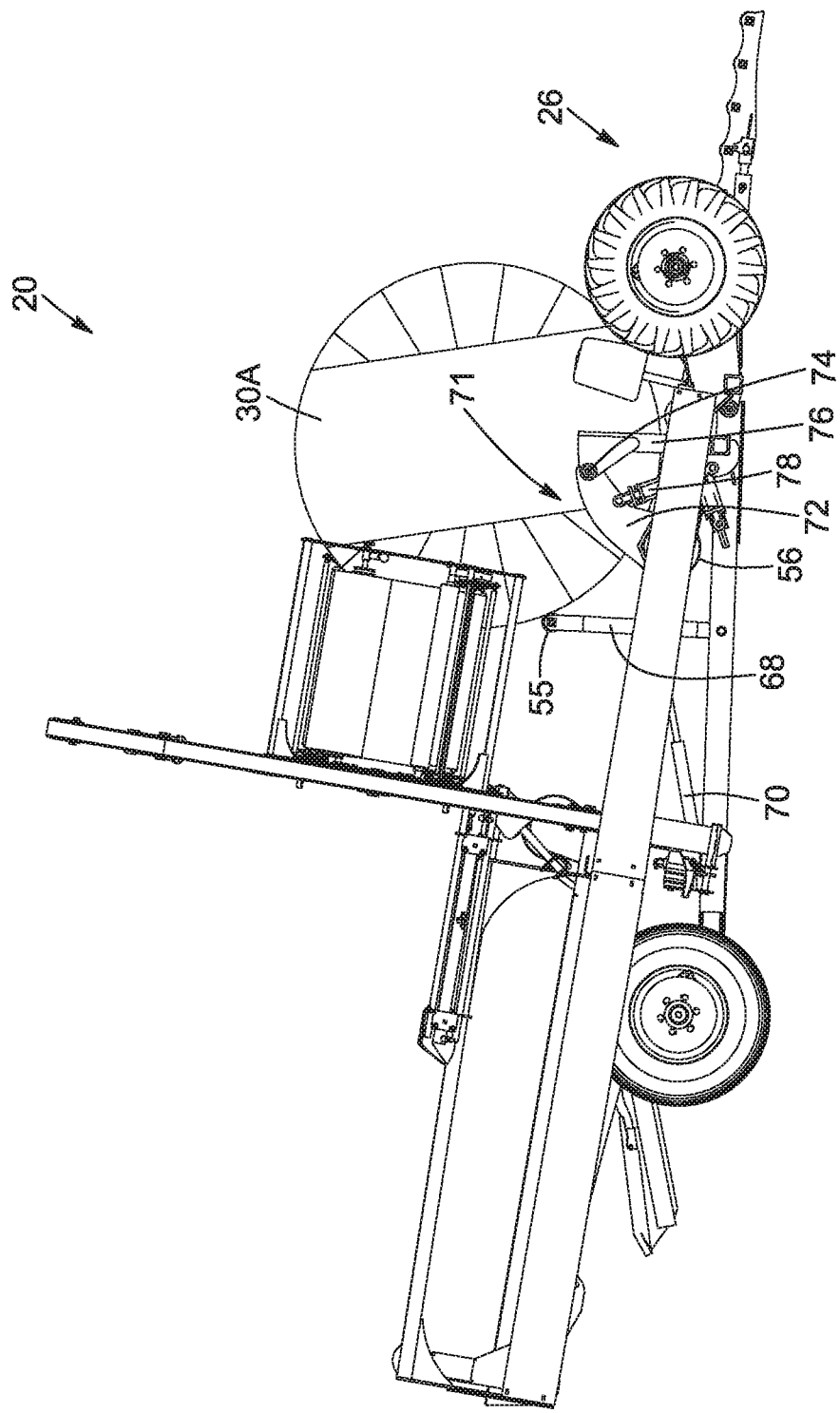

As better seen in FIGS. 4I and 4J, in the embodiment shown, the bale wrapping support assembly 52 further includes an intermediate support roller 55. As will be described in more details below, the intermediate support roller 55 is selectively pivotable between a raised position (see for example FIG. 4I) where the intermediate support roller 55 is engageable with the rounded peripheral surface of the bale 30A, when the bale wrapping apparatus 20 is configured in the single bale wrapping configuration, and a lowered position where the intermediate support roller 55 is lowered (or retracted) and prevented from engagement with the rounded peripheral surface of the bale 30A. One skilled in the art will understand that, in an alternative embodiment (not shown), the bale wrapping support assembly 52 could be free of intermediate support roller 55 or more than one intermediate support roller 55 could be provided.

In the embodiment shown, the intermediate support roller 55 is mounted on a distal end of pivoting poles 68. The pivoting poles 68 are pivotally mounted to the chassis 32 and linear actuators 70 are provided between the chassis 32 and the pivoting poles 68. Actuation of the linear actuators 70 allows the pivoting of the intermediate support roller 55 between the lowered position and the raised position, and vice-versa. In an embodiment, the linear actuators 70 are hydraulic cylinders. One skilled in the art will however understand that, in alternative embodiments, other linear actuator types such as a linear actuator with a pneumatic actuator, a lead-screw actuator, a vacuum actuator or the like could be used. Moreover, in alternative embodiments (not shown) a different assembly than the one of the embodiment shown could be used to selectively pivot the intermediate support roller 55 between the lowered position and the raised position.

In an embodiment, the support rollers 54, 56 are selectively powerable to induce rotation of a bale 30A supported thereon about the rotation axis R. One skilled in the art will understand that, in an embodiment, only one of the support rollers 54, 56 can be powered, while in an alternative embodiment both support rollers 54, 56, can be powered. One skilled in the art will understand that, in other alternative embodiments (not shown), more than two support rollers 54, 56 and an intermediate support roller 55 could be used. Moreover, other rotation inducing means than one or both of the support rollers 54, 56, being powered could be used to drive the bale 30A in rotation, when the apparatus 20 is configured in the single bale wrapping configuration.

As will be described in more details below, in an embodiment, the upstream support roller 54 is movable between a lowered position (see for example FIGS. 2 and 4C) and a raised position (see for example FIG. 4D). In the lowered position the upper end of the upstream support roller 54 is substantially evenly levelled with the floor surface 34 of the bale loading support structure 22, while in the raised position the upstream support roller 54 is moved upwardly and at least partially extend above the floor surface 34 of the bale loading support structure 22 (i.e. it has an upper end positioned at a higher position with regard to the lowered position). In an embodiment the upstream support roller 54 can be selectively moved between the raised position and the lowered position (and vice-versa) using a linear actuator (not shown) such as, for example and without being limitative a hydraulic cylinder. One skilled in the art will however understand that, in alternative embodiments, other actuator types such as a linear actuator with a pneumatic actuator, a lead-screw actuator, a vacuum actuator or the like could be used to selectively move the upstream support roller 54 between the raised position and the lowered position (and vice-versa).

In an embodiment, the downstream support roller 56 is pivotable between a raised position (see for example FIGS. 2 and 4C) and a lowered position (see for example FIG. 4J). In the lowered position the upper end of the downstream support roller 56 is substantially evenly levelled with the upper end of rolling rollers 27 of the bale unloading support structure 26, which will be described in more details below. In the raised position the downstream support roller 56 at least partially extends above the upper end of rolling rollers 27 of the bale unloading support structure 26 (i.e. it is positioned at a higher position with regard to the lowered position). In the embodiment shown, to allow the pivoting of the downstream support roller 56 between the lowered position and the raised position, the downstream support roller 56 is mounted to the chassis 32 of the apparatus 32 using pivoting arms 71. In the embodiment shown, two pivoting arms 71 are provided, with each pivoting arm 71 having a first section 72 connected to the downstream support roller 56 and a second section 76 mounted to the chassis 32 and extending upwardly therefrom on a lateral end thereof, to leave a clear path for passing bales inbetween. The first section 72 and the second section 76 are connected at a pivot point 74 to pivot relative to one another. A linear actuator 78 is also provided between the chassis 32 and the first section 72 of each pivoting arm 71. Actuation of the linear actuators 78 allows the pivoting of the downstream support roller 56 between the lowered position and the raised position, and vice-versa. In an embodiment, the linear actuators 78 are hydraulic cylinders. One skilled in the art will however understand that, in alternative embodiments (not shown), other linear actuator types such as a linear actuator with a pneumatic actuator, a lead-screw actuator, a vacuum actuator or the like could be used. Moreover, in alternative embodiments (not shown) a different assembly than the one of the embodiment shown could be used to selectively pivot the downstream support roller 56 between the lowered position and the raised position.

The bale wrapping support assembly 52 further comprises a longitudinal bale support 58. In order to allow the apparatus 20 to be used for both single wrapping operations and inline wrapping operations, while providing increased support of a bale located in the wrapping section 40 in the inline bale wrapping configuration, the longitudinal bale support 58 is selectively configurable between a retracted configuration and an extended configuration, to either allow engagement of a bale 30A positioned in the wrapping section 40 with the support rollers 54, 56 or support the bales 30A, 30B, 30C, 30D, 30E and 30F above the support rollers 54, 56 or prevent engagement of bales 30A, 30B, 30C, 30D, 30E and 30F with the support rollers 54, 56. In other words, the longitudinal bale support 58 is thus configurable between an extended configuration where it extends along at least a portion of the wrapping section 40 and above the support rollers 54, 56 and a retracted configuration wherein it extends away from the wrapping section 40.

For example and without being limitative, in the embodiment shown, the longitudinal bale support 58 is retractable along the longitudinal direction L and pivotable to allow the longitudinal bale support 58 to be retractable under the floor surface 34 of the bale loading support structure 22, when configured in the retracted configuration, as will be described in more details below.

More particularly, in the embodiment shown, when the bale wrapping apparatus 20 is configured in the inline bale wrapping configuration, as shown in FIG. 1, the longitudinal bale support 58 is configured in the extended configuration where the longitudinal bale support 58 is extended above the support rollers 54, 56, for supporting the bales 30A, 30B, 30C, 30D, 30E and 30F positioned in the wrapping section 40 above the support rollers 54, 56, thereby preventing engagement of the bales 30A, 30B, 30C, 30D, 30E and 30F with the support rollers 54, 56. In the embodiment shown, when the longitudinal bale support 58 is configured in the extended configuration, the longitudinal bale support 58 defines an extension of the floor surface 34 of the bale loading support structure 22, which extends into the wrapping section 40, above the support rollers 54, 56. When the bale wrapping apparatus 20 is configured in the single bale wrapping configuration, as shown in FIG. 2, the longitudinal bale support 58 is configured in the retracted configuration where the longitudinal bale support 58 is moved away from the wrapping section 40 and the support rollers 54, 56 and does not extend above the support rollers 54, 56. Hence, in the retracted configuration, engagement of the longitudinal bale support 58 with the bale 30A positioned in the wrapping section 40 is prevented, which allows engagement between the support rollers 54, 56 and the bale 30A positioned in the wrapping section 40.

In the embodiment shown, the longitudinal bale support 58 comprises two elongated members 64 extending substantially parallel to the longitudinal axis L and spaced apart from one another. The elongated members 64 can be positioned in an extended position where they extend in a substantially horizontal orientation, to configure the longitudinal bale support 58 in the extended configuration (see FIG. 1), or positioned in a retracted position, to configure the longitudinal bale support 58 in the retracted configuration (see FIG. 2). In the embodiment shown, when the longitudinal bale support 58 is configured in the retracted configuration (see FIG. 2), the elongated members 64 are retracted under the floor surface 34 of the bale loading support structure 22 and pivoted in an inclined orientation to ease the movement of the elongated members 64 between the retracted configuration and the extended configuration. In an embodiment, the elongated members 64 are mounted to a support base 65 at a proximal end thereof (see FIG. 4A).

In the embodiment, shown, the elongated members 64 comprise two cylindrical rods, but one skilled in the art will understand that, in alternative embodiments, other types of elongated members 64 could be used. It will also be understood that, in alternative embodiment (not shown), more or less than the two elongated members 64 could be provided. Indeed, in an embodiment more than two elongated members 64 extending substantially parallel to the longitudinal axis L and spaced apart from one another could be provided (and could have cross connection(s) to increase the rigidity of the assembly). In another alternative embodiment (not shown), the longitudinal bale support 58 could have a single supporting element such as, for instance, a support platform having a sufficient width to support a bale and having a plane or curvilinear support surface.

Referring to FIGS. 1, 2, 3A and 4A, in an embodiment, the elongated members 64 of the longitudinal bale support 58 are actuated by a rack and pinion assembly (not shown) and are movable along a guiding rail 66. In more detail, in an embodiment, the guiding rail 66 includes a rack (not shown) and the support base 65 is operatively connected to a pinion (not shown) engageable with the rack to move the support base 65 along the guiding rail 66. In an embodiment, the pinion (not shown) can be actuated by a user, using a manual crank (not shown). One skilled in the art will easily understand that, in an alternative embodiment, the pinion (not shown) could also be actuated using motorized means. In an embodiment, the guiding rail 66 is kinked to define an inclined section 66A and a substantially horizontal section (not shown) positioned downstream of the inclined section 66A. Hence, when the support base 65 is moved along the inclined section 66A of the guiding rail 66, the elongated members 64 are positioned in the inclined orientation (see FIG. 4A) and when the support base 65 transitions to the substantially horizontal section (not shown) of the guiding rail 66, the elongated members 64 transition to the substantially horizontal orientation (see FIG. 1) (and vice-versa). One skilled in the art will understand that, in alternative embodiments, the elongated members 64 of the longitudinal bale support 58 could be actuated using other actuation mechanisms such as, for example and without being limitative, pivotable linear actuators or the like.

In an alternative embodiment (not shown), in order to allow both the single and inline bale wrapping configurations, the upstream support roller 54 could have peripheral grooves enabling the elongated members 64 of the longitudinal bale support 58 to extend through the peripheral grooves in the inline bale wrapping configuration and to be retracted by sliding through the peripheral grooves and extending away from the wrapping section 40 in the single bale wrapping configuration. It is appreciated that each peripheral groove could be shaped as a continuous annular groove that would enable an elongated member to slide through the peripheral groove. It can be appreciated that, in an embodiment both support rollers 54, 56 could comprise peripheral grooves. On skilled in the art will understand that, in such an embodiment, the longitudinal bale support 58 could partially prevent engagement between bales and the support rollers 54, 56, when configured in the extended configuration (i.e. when the apparatus 20 is configured in the inline bale wrapping configuration) and allow full engagement between bales and the support rollers 54, 56, when configured in the retracted configuration (i.e. when the apparatus 20 is configured in the single bale wrapping configuration).

The bale unloading support structure 26 is positioned downstream of the wrapping section 40 and is sized, shaped and configured for receiving wrapped bales from the bale wrapping mechanism 24, with the bales travelling onto the bale unloading support structure 26, towards an adjacent ground surface. In the embodiment shown, the bale unloading support structure 26 includes a plurality of free rolling rollers 27 operating as conveying elements to favor the movement of the bales on the bale unloading support structure 26 and towards the adjacent ground surface. One skilled in the art will understand that, in alternative embodiments, other types of conveying elements, such as a conveying belt or the like could be used instead or the rollers 27, or that the unloading support structure 26 could simply comprise a substantially flat surface allowing the bales to slide thereon.

In view of the above and as will be described in more details below, in both the inline bale wrapping configuration (see FIGS. 1 and 3A to 3G) and the single bale wrapping configuration (see FIGS. 2 and 4A to 4K), the film-carrying device 28 rotates around one bale 30A or multiple bales 30A, 30B, 30C, 30D, 30E and 30F to dispense wrapping film 36 and wrap the corresponding bale positioned in the wrapping section 40. The distinction between the inline bale wrapping configuration (see FIG. 1) and the single bale wrapping configuration (see FIG. 2) is that, in the inline bale wrapping configuration, the bales 30A, 30B, 30C, 30D, 30E and 30F are maintained in the same angular position by the longitudinal bale support 58 (i.e. by the elongated members 64 extending over the support rollers 54, 56) as they travel through the wrapping section 40, while, in the single bale wrapping configuration, the bale 30A engages the support rollers 54, 56 and is driven in rotation about the rotation axis R by the action of the support rollers 54, 56, while it is being wrapped in the wrapping section 40.

Hence, when the bale wrapping apparatus 20 is configured in the single bale wrapping configuration, the crosswise oriented bale 30A is driven in rotation while the film-carrying device 28 rotates around the bale 30A positioned in the wrapping section 40. When the bale wrapping apparatus 20 is configured in the inline bale wrapping configuration, the film-carrying device 28 rotates around the corresponding bale 30A, 30B, 30C, 30D, 30E and 30F (which does not rotate and simply moves longitudinally along the longitudinal axis L as it is supported on the longitudinal bale support 58) and once the wrapping of a first bale 30A is completed, the first bale 30A is pushed towards the bale unloading support structure 26 by a second bale 30B which is now being wrapped.

Operation of the Apparatus in the Inline Bale Wrapping Configuration

Referring to FIGS. 3A to 3G, a sequence of operations of the bale wrapping apparatus 20 for wrapping multiple bales 30A, 30B, 30C, 30D, 30E and 30F successively in a single tube is shown. One skilled in the art will understand that the number of multiple bales 30A, 30B, 30C, 30D, 30E and 30F which can be wrapped successively is only indicative and is not limited by the embodiment shown in the Figures.

As can be seen in the Figures, when the apparatus 20 is configured in the inline bale wrapping configuration, the downstream support roller 56 is maintained in the lowered position, not to impede the movement of the bales 30A, 30B, 30C, 30D, 30E and 30F, with the elongated members 64 of the longitudinal bale support 58 being in the extended position (i.e. with the bale support 58 being in the extended configuration), where they are positioned in the substantially horizontal orientation over the support rollers 54, 56, to successively support the bales 30A, 30B, 300, 30D, 30E and 30F over the support rollers 54, 56 and prevent contact therewith, as each one of the bales is successively moved along the wrapping section 40.

Figure 3A:
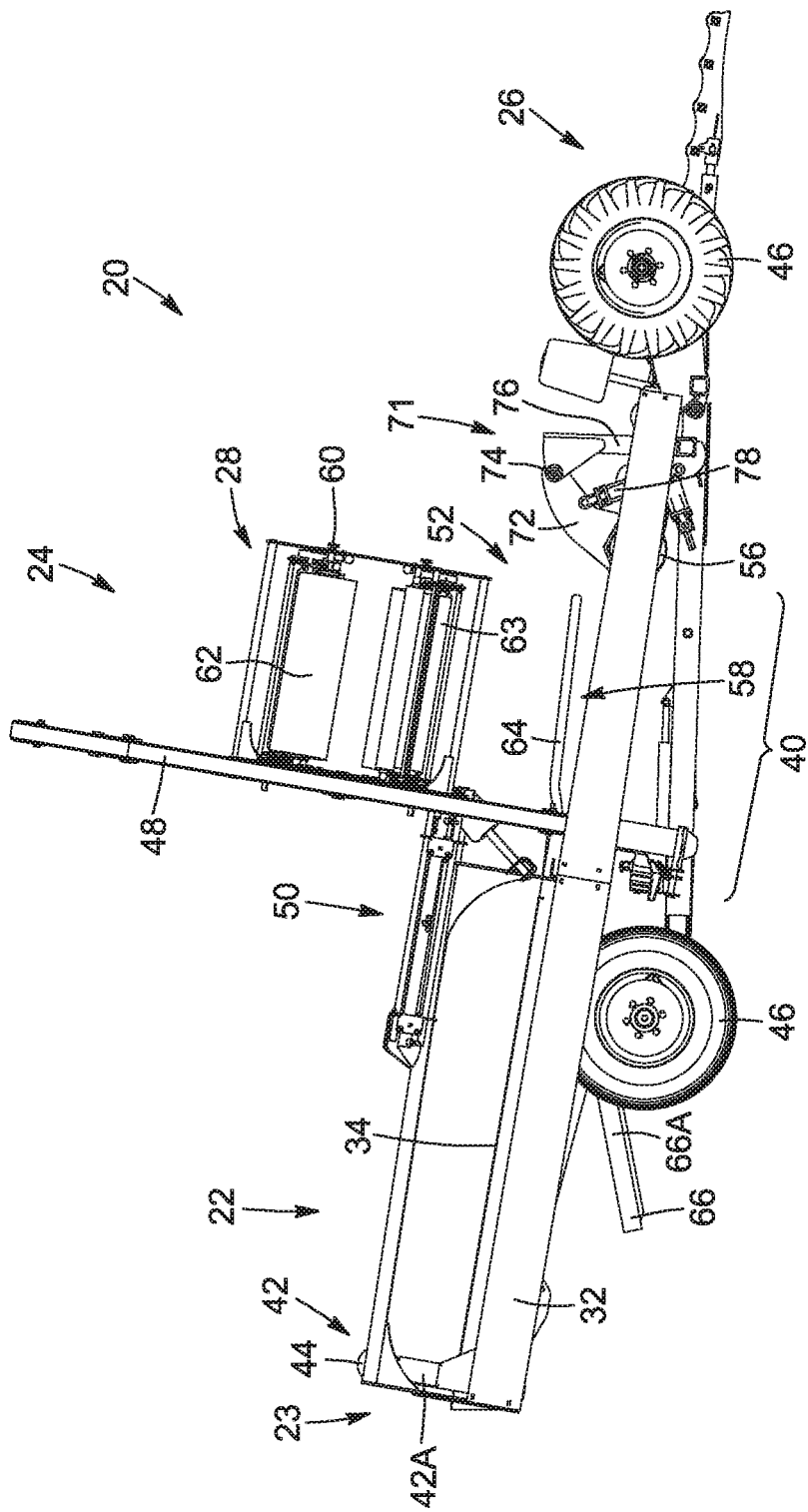
Figure 3B:
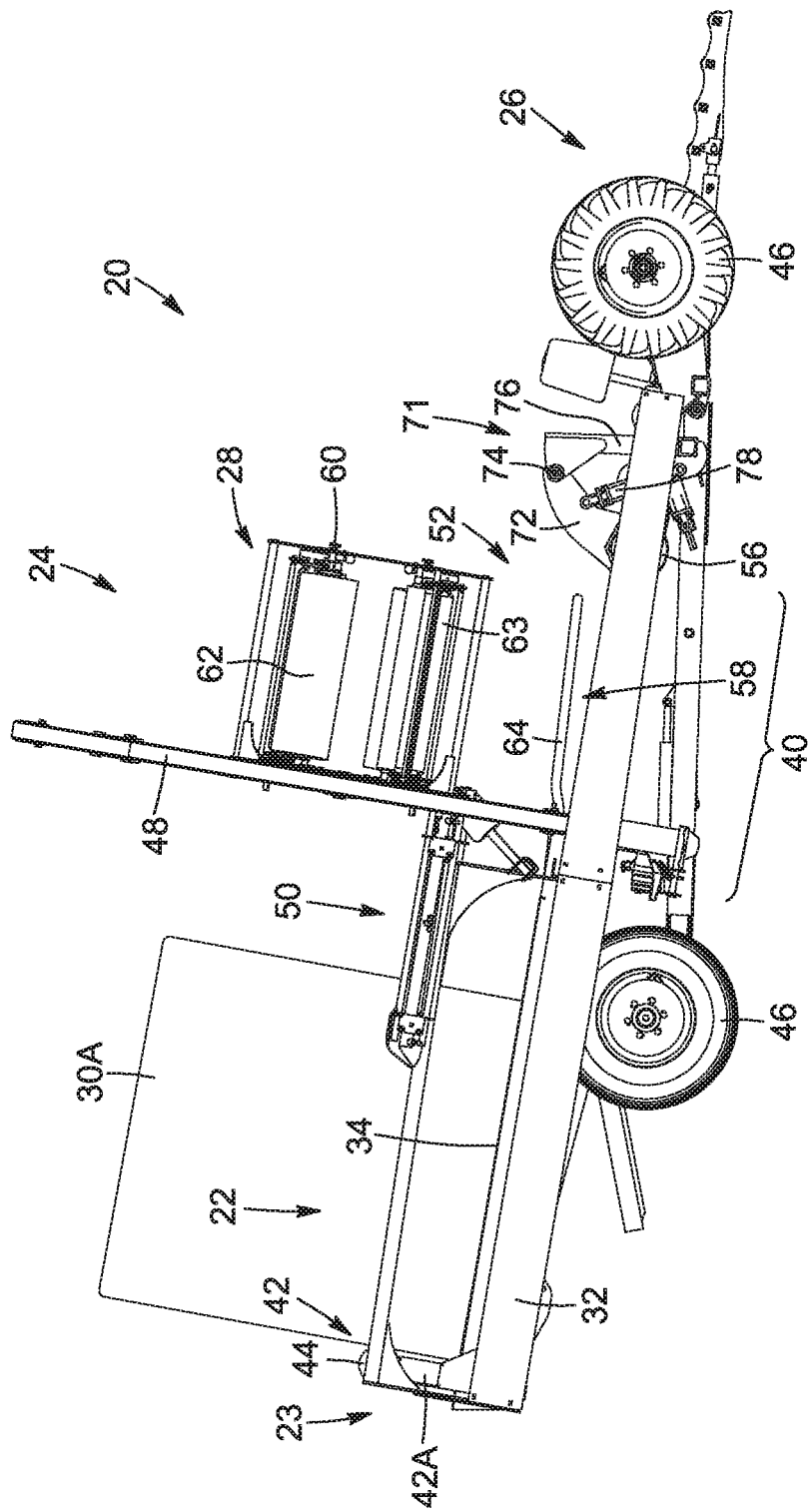

FIG. 3A shows the wrapping apparatus 20 before a first bale 30A is received and FIG. 3B shows the first bale 30A loaded on the bale loading support structure 22, with the bale wrapping apparatus 20 in the inline bale wrapping configuration.

Figure 3C:
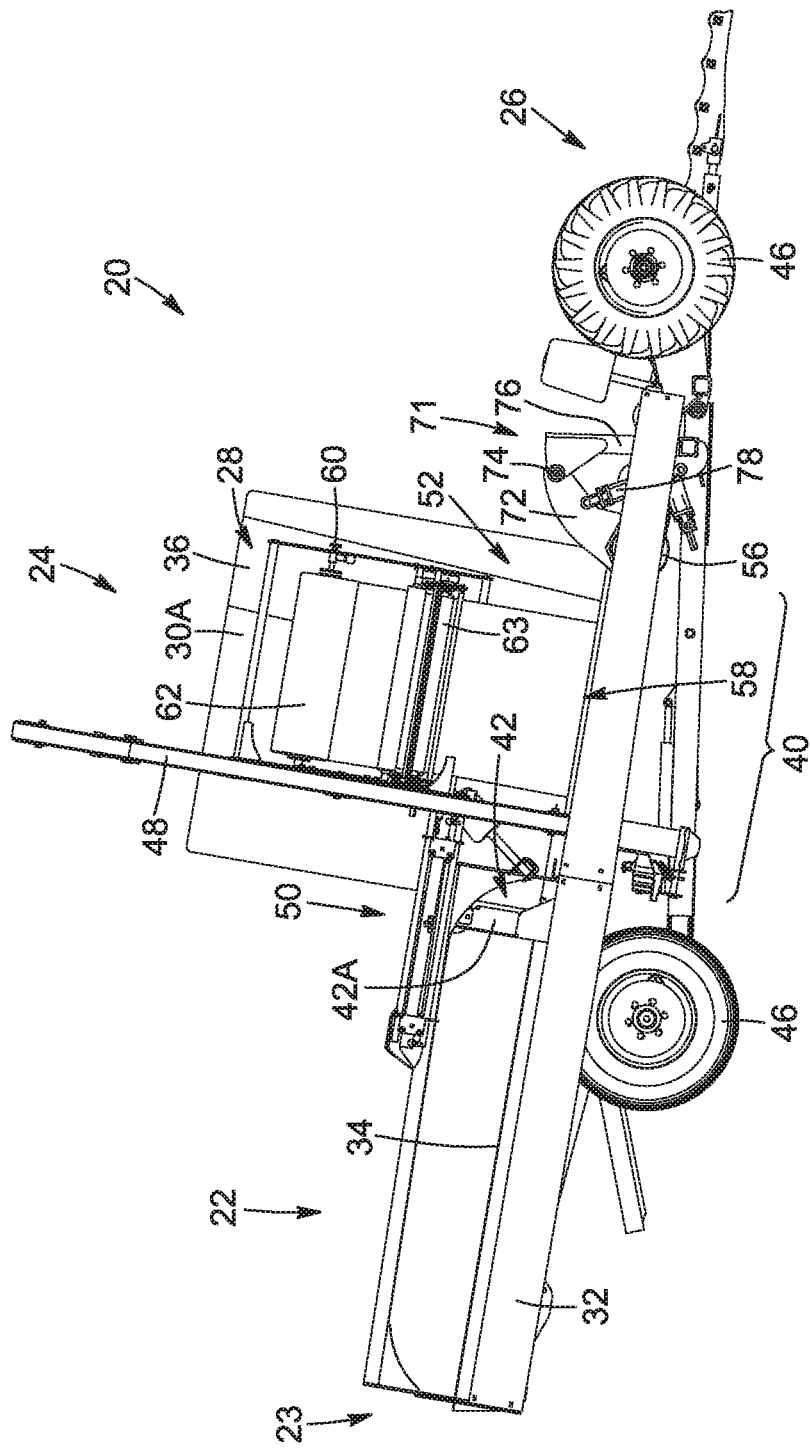
Figure 3D:
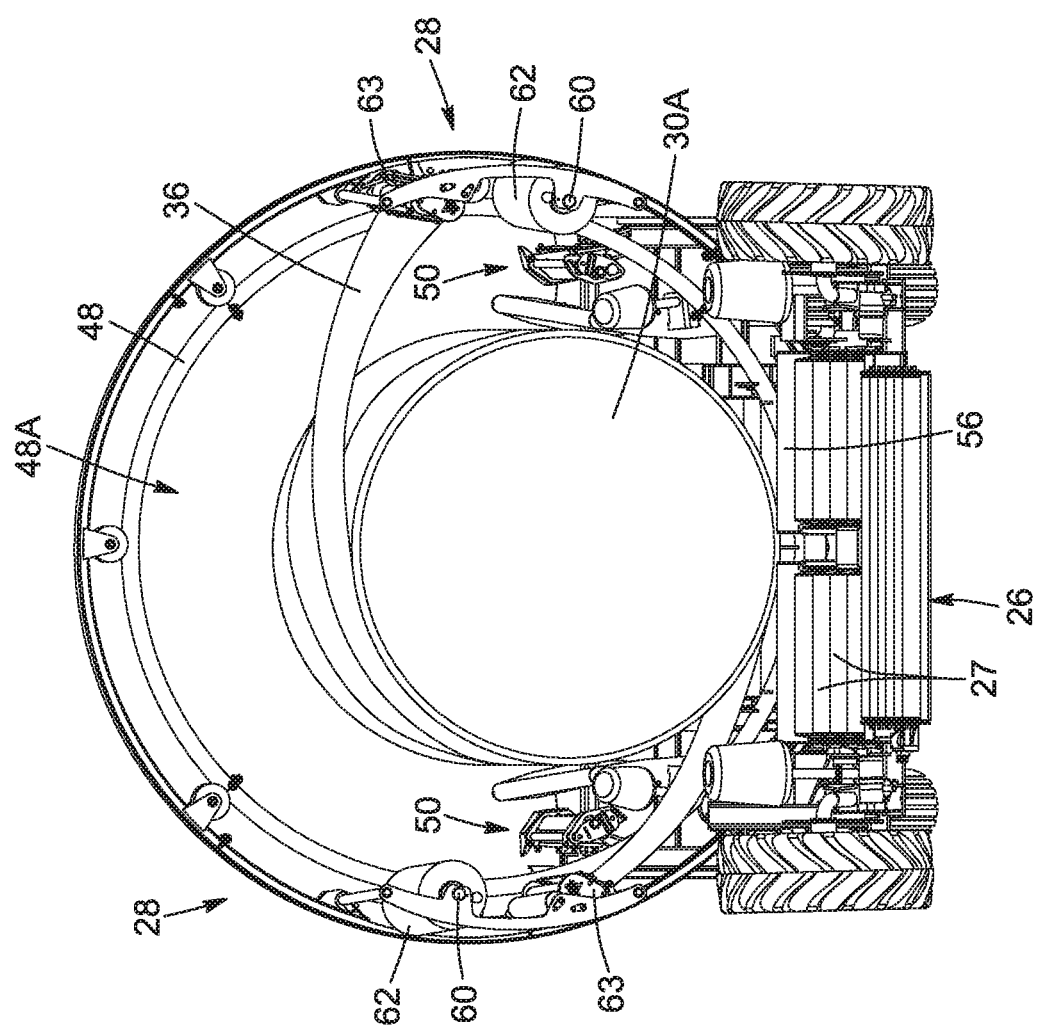

FIGS. 3C and 3D show the first bale 30A being moved from the bale loading support structure 22 to the wrapping section 40 by the bale biasing member 42 being moved longitudinally towards the wrapping section 40 and the first bale 30A being wrapped by the bale wrapping mechanism 24.

It will be understood that, when wrapping is applied around the first bale 30A, with the longitudinal bale support 58 configured in the extended position, wrapping is applied over the longitudinal bale support 58 (over the elongated members 64), thereby trapping the longitudinal bale support 58 against the bale surface. However, when the wrapped first bale 30A is pushed from the wrapping section 40 to the bale unloading support structure 26, the wrapping film 36 slides on the longitudinal bale support 58, thereby releasing the longitudinal bale support 58 from the corresponding bale 30A.

Figure 3E:
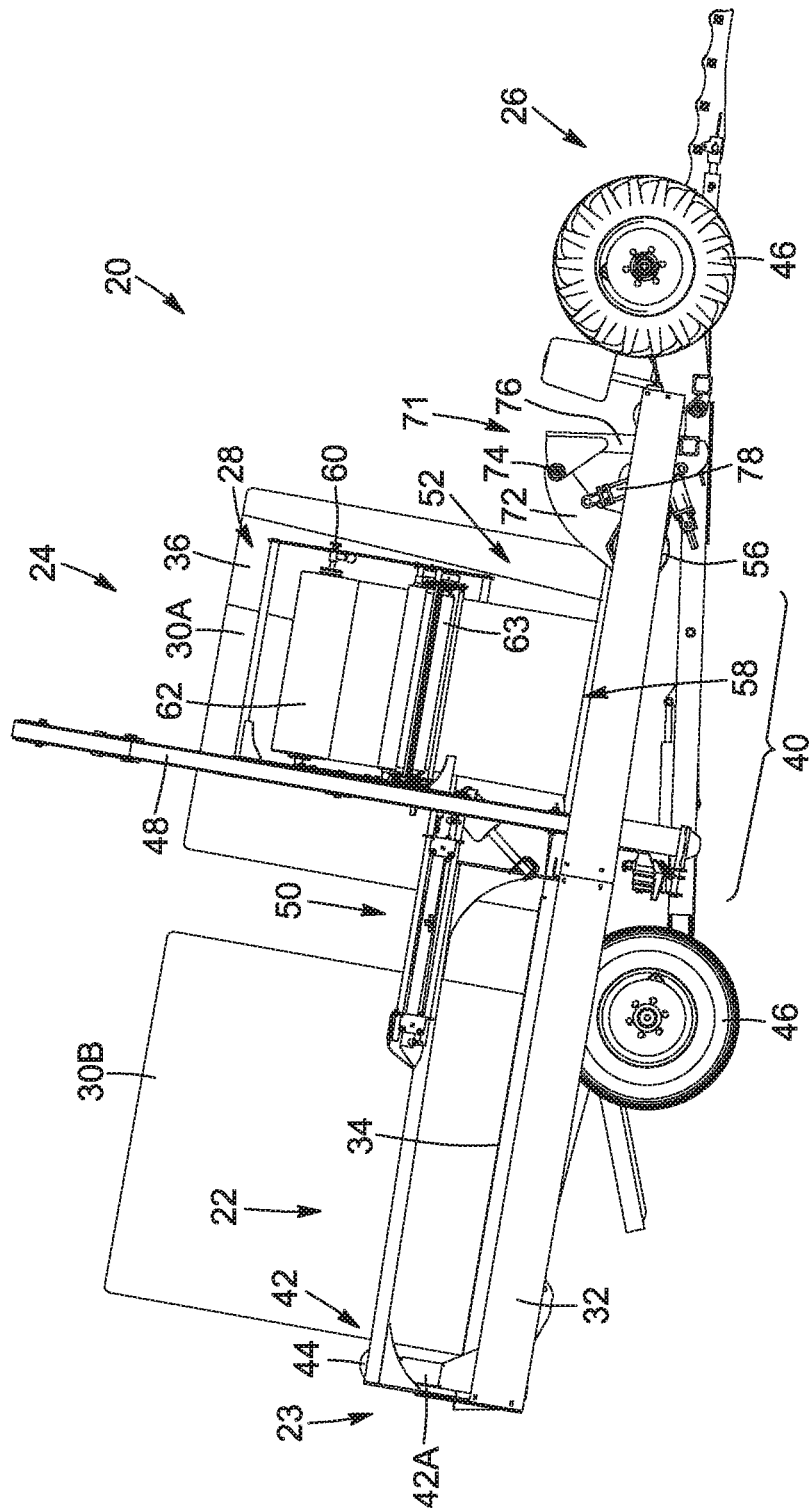

FIG. 3E shows a second bale 30B loaded on the bale loading support structure 22, while the first bale 30A is being wrapped.

Figure 3F:
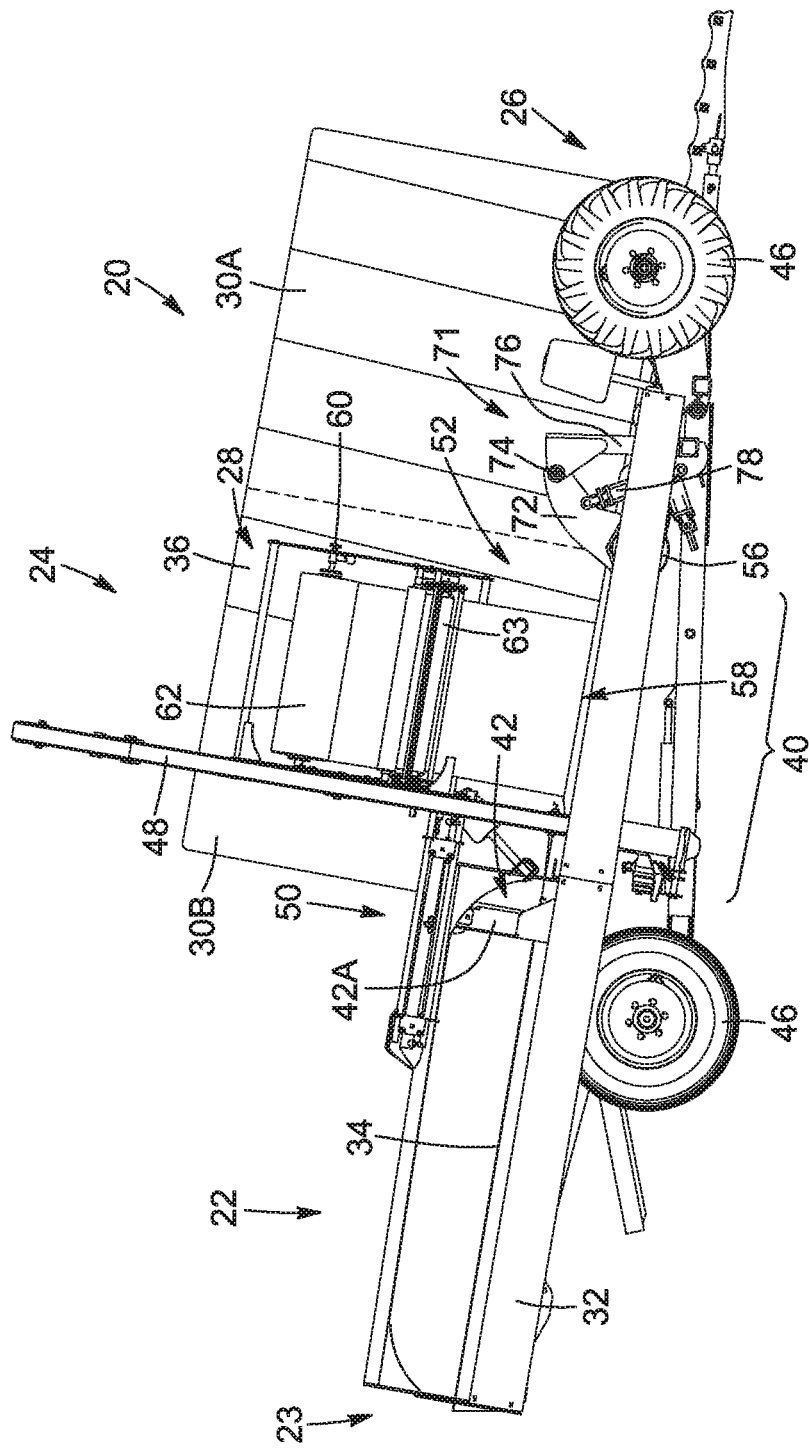

FIG. 3F shows the second bale 30B being moved from the bale loading support structure 22 to the wrapping section 40 by the bale biasing member 42 being moved longitudinally towards the wrapping section 40. The forward surface of the second bale 30B is pressed against the rearward surface of the first bale 30A, such that the second bale 30B pushes the first bale 30A out of the wrapping section 40 and onto the bale unloading support structure 26. The second bale 30B is also wrapped by the bale wrapping mechanism 24, such that the first bale 30A and the second bale 30B are wrapped in a single tube.

One skilled in the art will understand that operation of the bale biasing member 42 helps reducing the amount of trapped air between the bales, by pressing the bales 30A, 30B together. The compaction between bales 30A, 30B leads to higher silage quality.

Figure 3G:
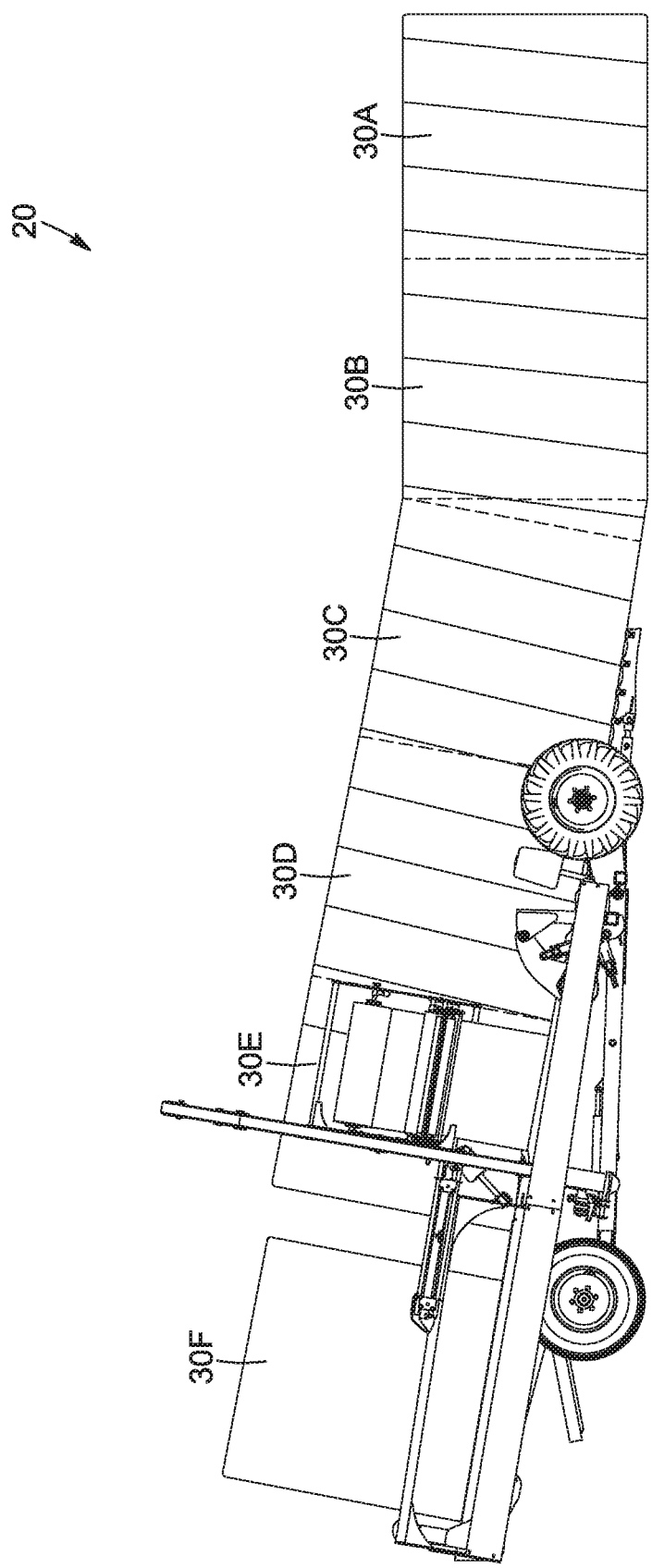

FIG. 3G shows the operation described above in connection with FIG. 3F being repeated successively for multiple bales, thereby producing multiple bales 30A, 30B, 30C, 30D, 30E and 30F being wrapped in a single tube of wrapping film 36.

Operation of the Apparatus in the Single Bale Wrapping Configuration

Now referring to FIGS. 4A to 4K, there is shown the bale wrapping apparatus 20 in the single bale wrapping configuration, with the process of receiving an unwrapped bale, wrapping, and unloading a wrapped bale in order to wrap bales individually being summarized below.

As can be seen in the Figures, when the apparatus 20 is configured in the single bale wrapping configuration, the elongated members 64 of the longitudinal bale support 58 are in the retracted position (i.e. the bale support 58 is in the retracted configuration), with the elongated members 64 being positioned in the inclined orientation and retracted under the floor 34 of the bale loading support structure 22 to allow the bale 30A to engage the support rollers 54, 56 when it is positioned in the wrapping section 40 and it is being wrapped by the bale wrapping mechanism 24. This allows the bale 30A to be rotated along the rotation axis R simultaneously as it is wrapped with wrapping film 36 from the film carrying device 28 circling along the frame 48 and around the bale 30A to individually completely wrap the bale 30A.

FIG. 4A shows the wrapping apparatus 20 before a bale 30A is received and FIG. 4B shows the bale 30A loaded on the bale loading support structure 22, with the bale wrapping apparatus 20 in the single bale wrapping configuration.

FIG. 4C shows the bale 30A being moved from the bale loading support structure 22 to the wrapping section 40 by the bale biasing member 42 being moved longitudinally towards the wrapping section 40 and the first bale 30A being wrapped by the bale wrapping mechanism 24. At this stage, the upstream support roller 54 is positioned in the lowered position.

FIG. 4D shows the upstream support roller 54 being moved from the lowered position to the raised position. The movement of the upstream support roller 54 from the lowered position to the raised position allows positioning of the bale 40 towards the center of the void middle section 48A of the frame 48 of the bale wrapping mechanism 24, thereby preventing interference between the bale 30 and the film carrying device 28 as the film carrying device 28 is moved along the frame 48 and circles the bale 30A.

FIGS. 4D and 4E also show the film-carrying device 28 being brought in movement along the frame 48 and around the bale 30 to begin covering a section of the bale 30A with wrapping film 36. At this stage, the bale 30A has not started rotating along the rotation axis R, the support rollers 54, 56 not imparting a rotating movement on the bale 30A yet.

FIGS. 4F and 4G show the film-carrying device 28 brought in movement along the frame 48 and around the bale 30A as the bale is rotated along the rotation axis R by the support rollers 54, 56, in order to cover the entire bale 30A with wrapping film 36. As mentioned above, the rotation of the bale 30A along the rotation axis R is performed by at least one of the support rollers 54, 56 being actuated to bring the bale in rotation along the rotation axis R.

FIG. 4H shows the wrapping film 36 being cut to release the bale 30A from the film carrying device 28. The wrapping film 36 is cut using the film cutting mechanism 50 which engages a section of the wrapping film 36 and severs the wrapping film 36 transversally to release the wrapped bale 30A.

FIG. 4I shows the intermediate support roller 55 being brought from the lowered position to the raised position, to engage a section of the peripheral wall of the bale 30A and support the corresponding section of the bale 30A. Movement of the intermediate support roller 55 is performed through extension of the linear actuator 70. As can be seen in FIG. 4I, at this stage, the downstream support roller 56 is positioned in the raised position.

FIG. 4J shows the downstream support roller 56 being moved from the raised position to the lowered position and the intermediate support roller 55 being moved further upwardly, in order to move the wrapped bale 30A from the wrapping section 40 to the bale unloading support structure 26 by gravity. Movement of the intermediate support roller 55 is performed through further extension of the linear actuator 70, while movement of the downstream support roller 56 is performed through retraction of the linear actuator 78. Displacement of the downstream support roller 56 from the raised position to the lowered position, causes the bale 30A to roll towards the bale unloading support structure 26, as it is no longer supported by the downstream support roller 56.

In the embodiment shown in FIG. 4J, the intermediate support roller 55 is moved further upwardly as the downstream support roller 56 is moved from the raised position to the lowered position to favor the movement of the bale 30A towards the bale unloading support structure 26. One skilled in the art will understand that, in an alternative embodiment (not shown) the intermediate support roller 55 could however remain static at this stage, its position being such that the bale 30A being supported only on the intermediate support roller 55 would cause a sufficient rolling movement towards the bale unloading support structure 26 by gravity.

It will also be understood that, in an alternative embodiment, no intermediate support roller 55 could be provided, the position (and possible movement) being such that the bale 30A being supported only on the upstream support roller 54 would cause a sufficient rolling movement towards the bale unloading support structure 26 by gravity, when the downstream support roller 56 is moved from the raised position to the lowered position.

Figure 4K:
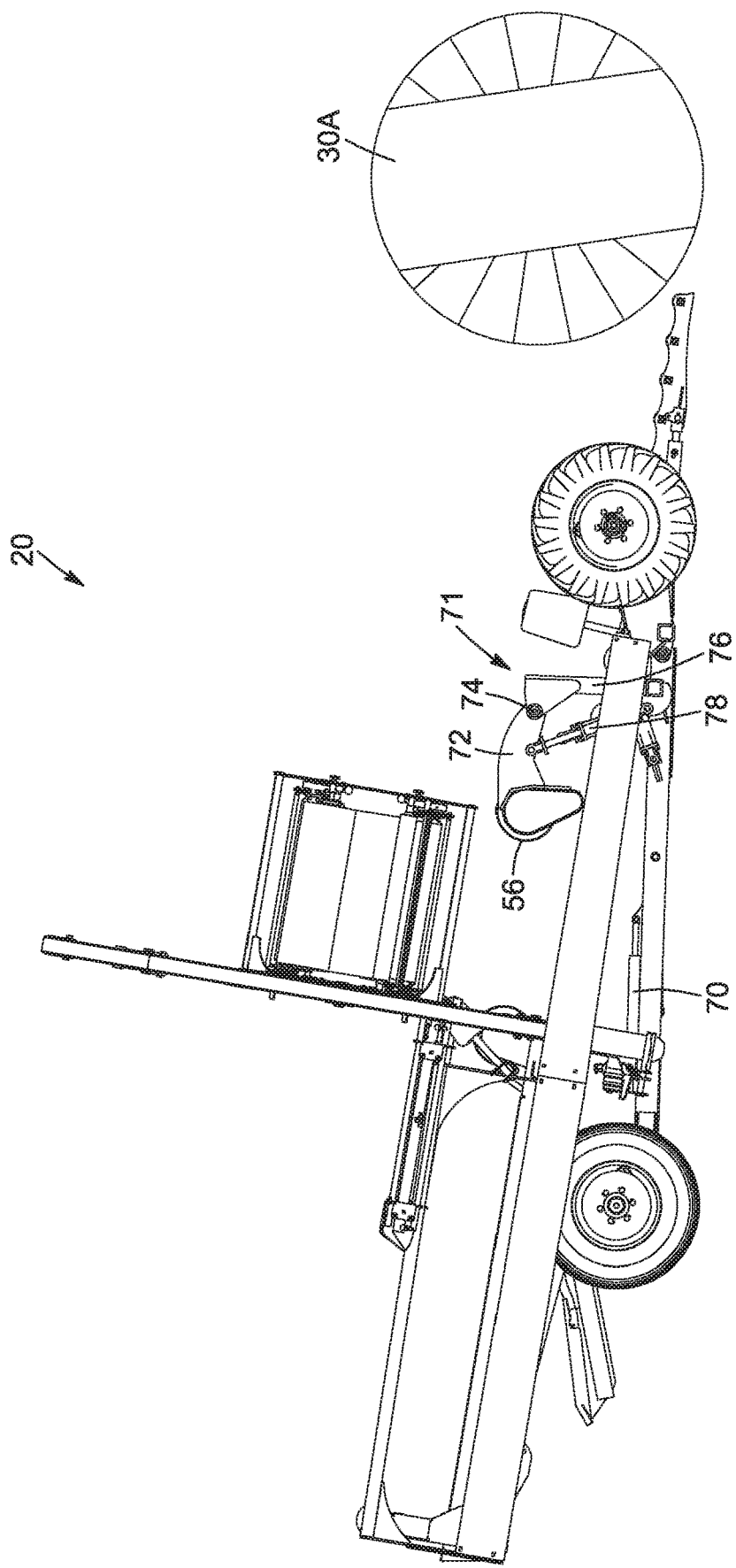

FIG. 4K shows the downstream support roller 56 being moved from the lowered position to the raised position to provide a push of the wrapped bale 30A towards the ground surface, once the wrapping thereof is finished and the bale 30A has been moved to the bale unloading support structure 26. In other words, after the wrapping operation, the wrapped bale 30A can be pushed by the downstream support roller 56 to travel towards the ground from the bale unloading support structure 26. Movement of the downstream support roller 56 is performed through expansion of the linear actuator 78

One skilled in the art will understand that, in an alternative embodiment (not shown), other components different from the support roller 56 of the embodiment shown could be used to provide the selective impulsion onto the wrapped bale 30A, to move the wrapped bale 30A towards a ground surface, once wrapping thereof is done. Moreover, the support roller 56 could be moved in a motion different than the shown pivoting motion, such as, for example, a linear motion or the like when moved between the lowered position and the raised position and vice-versa.

It will be understood that the process shown in FIG. 4B to 4K can be repeated numerous times to individually wrap multiple bales sequentially.

In an alternative embodiment (not shown), in order to intermittently prevent unwrapped bales positioned on the floor surface 34 of the bale loading support structure 22 from moving downstream of the bale loading support structure 22, when the bale wrapping apparatus 20 is configured in the single bale wrapping configuration, the bale loading support structure 22 could also be provided with a bale stopper system. For example and without being limitative, the bale stopper system could include one or more retractable stoppers movable between a bale stopping position where they extend upwardly from the floor surface 34 and a bale moving position where they are retracted with their upper surface substantially level or below the floor surface 34. It will be understood that, when the bale wrapping apparatus 20 is configured in the inline bale wrapping configuration, the retractable stoppers would always be positioned in the bale moving position. Other assemblies or configurations thereof could also be provided to allow a bale 30A to be momentarily prevented from rolling towards the wrapping section 40, when the bale wrapping apparatus 20 is in the single bale wrapping configuration (i.e. when the bales are oriented in a crosswise orientation). For example and without being limitative, in an alternative embodiment (not shown) the bale stoppers could be extendable from lateral bale guides rather than from the floor surface 34, could be moved longitudinally rather than pivotably, etc.

In a non-limitative embodiment, the bale wrapping apparatus 20 comprises moving means such as wheels 46 to enable wrapping of bales and displacement of the bale wrapping apparatus 20 in a field for example. It can be appreciated that the bale wrapping apparatus 20 can comprise other moving means or that it can be stationary.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A bale wrapping apparatus having a longitudinal axis and being configurable between a single bale wrapping configuration and an inline bale wrapping configuration, the bale wrapping apparatus comprising:
   a bale loading support structure;
   a bale unloading support structure positioned downstream of the bale loading support structure along the longitudinal axis; and
   a bale wrapping mechanism positioned in a wrapping section located between the bale loading support structure and the bale unloading support structure, the bale wrapping mechanism having a rotation axis substantially perpendicular to the longitudinal axis and comprising:
      a frame extending substantially perpendicularly to the longitudinal axis;
      a film-carrying device operatively mounted to the frame and movable therealong to be drivable around a bale positioned in the wrapping section; and
      a bale wrapping support assembly extending at least partially along the wrapping section and comprising:
         support rollers extending substantially perpendicularly to the longitudinal axis and spaced apart from one another, the support rollers being fully engageable with the bale positioned in the wrapping section to drive the bale in rotation along the rotation axis, when the bale wrapping apparatus is configured in the single bale wrapping configuration, the support rollers comprising at least an upstream support roller and a downstream support roller, with the upstream support roller being selectively movable between a lowered position and a raised position;
         an intermediate support movable between a lowered configuration where it is disengaged from a peripheral surface of the bale positioned in the wrapping section and a raised configuration where it is engaged with the peripheral surface of the bale, positioned in the wrapping section, between the upstream support roller and the downstream support roller; and
         a longitudinal bale support engageable with the bale positioned in the wrapping section to support the bale above the support rollers when the bale wrapping apparatus is configured in the inline bale wrapping configuration, the longitudinal bale support being movable in an extended configuration at least partially preventing engagement between the support rollers and the bale positioned in the wrapping section when the bale wrapping apparatus is configured in the inline bale wrapping configuration and in a retracted configuration allowing full engagement between the support rollers and the bale positioned in the wrapping section when the bale wrapping apparatus is configured in the single bale wrapping configuration.

2. The bale wrapping apparatus as claimed in claim 1, wherein at least one of the upstream support roller and the downstream support roller is powered.

3. The bale wrapping apparatus as claimed in claim 1, wherein the downstream support roller is selectively pivotable between a lowered position and a raised position.

4. The bale wrapping apparatus as claimed in claim 1, wherein the intermediate support is a support roller.

5. The bale wrapping apparatus as claimed in claim 1, wherein the longitudinal bale support comprises at least two elongated members extending longitudinally along the longitudinal axis.

6. The bale wrapping apparatus as claimed in claim 5, wherein the at least two elongated members are pivotable between an inclined orientation and a substantially horizontal orientation, the at least two elongated members being positioned in the substantially horizontal orientation when the bale wrapping apparatus is configured in the inline bale wrapping configuration and being positioned in the inclined orientation when the bale wrapping apparatus is configured in the single bale wrapping configuration.

7. The bale wrapping apparatus as claimed in claim 1, wherein the bale loading support structure comprises a bale biasing member movable substantially parallel to the longitudinal axis to push a bale towards the wrapping section.

8. A bale wrapping apparatus having a longitudinal axis and being configurable between a single bale wrapping configuration and an inline bale wrapping configuration, the bale wrapping apparatus comprising:
   a bale loading support structure;
   a bale unloading support structure positioned downstream of the bale loading support structure along the longitudinal axis; and
   a bale wrapping mechanism positioned in a wrapping section located between the bale loading support structure and the bale unloading support structure, the bale wrapping mechanism having a rotation axis substantially perpendicular to the longitudinal axis and comprising:
      a frame extending substantially perpendicularly to the longitudinal axis;
      a film-carrying device operatively mounted to the frame and movable therealong to be drivable around a bale positioned in the wrapping section; and
      a bale wrapping support assembly extending at least partially along the wrapping section and comprising:
         support rollers extending substantially perpendicularly to the longitudinal axis and spaced apart from one another, the support rollers being fully engageable with the bale positioned in the wrapping section to drive the bale in rotation along the rotation axis, when the bale wrapping apparatus is configured in the single bale wrapping configuration,
         a longitudinal bale support engageable with the bale positioned in the wrapping section to support the bale above the support rollers when the bale wrapping apparatus is configured in the inline bale wrapping configuration, the longitudinal bale support being movable in an extended configuration at least partially preventing engagement between the support rollers and the bale positioned in the wrapping section when the bale wrapping apparatus is configured in the inline bale wrapping configuration and in a retracted configuration allowing full engagement between the support rollers and the bale positioned in the wrapping section when the bale wrapping apparatus is configured in the single bale wrapping configuration,
   wherein the bale loading support structure comprises a bale biasing member movable substantially parallel to the longitudinal axis to push a bale towards the wrapping section, and
   wherein the bale biasing member comprises a roller extending substantially transversally with respect to the longitudinal axis, the roller being rotatable and engageable with the bale to drive the bale in rotation towards the wrapping section when the bale wrapping apparatus is configured in the single bale wrapping configuration.

9. A bale wrapping apparatus having a longitudinal axis and being configurable between a single bale wrapping configuration and an inline bale wrapping configuration, the bale wrapping apparatus comprising:
   a chassis;
   a bale loading support structure mounted to the chassis for receiving unwrapped bales;
   a bale wrapping mechanism positioned in a wrapping section located downstream of the bale loading support structure along the longitudinal axis and adjacent thereto, the bale wrapping mechanism comprising:
      an annular frame extending substantially perpendicularly to the longitudinal axis;
      a film-carrying device operatively mounted to the annular frame and movable therealong to be drivable around a bale positioned in the wrapping section; and
      a bale wrapping support assembly comprising:
         support rollers extending substantially perpendicularly to the longitudinal axis and spaced apart from one another therealong to drive the bale in rotation along a rotation axis extending perpendicular to the longitudinal axis, when the bale wrapping apparatus is configured in the single bale wrapping configuration; and
         a longitudinal bale support configurable between an extended configuration where the longitudinal bale support extends along at least a portion of the wrapping section above the support rollers and a retracted configuration wherein the longitudinal bale support extends away from the wrapping section, the longitudinal bale support being positioned in the retracted configuration when the bale wrapping apparatus is configured in the single bale wrapping configuration and being configured in the extended configuration when the bale wrapping apparatus is configured in the inline bale wrapping configuration; and
   a bale unloading support structure mounted to the chassis downstream of the wrapping section along the longitudinal axis and adjacent thereto for receiving wrapped bales from the bale wrapping mechanism.

10. The bale wrapping apparatus as claimed in claim 9, wherein the support rollers comprise at least an upstream support roller and a downstream support roller.

11. The bale wrapping apparatus as claimed in claim 10, wherein at least one of the upstream support roller and the downstream support roller is powered.

12. The bale wrapping apparatus as claimed in claim 10, wherein the upstream support roller is selectively movable between a lowered position and a raised position.

13. The bale wrapping apparatus as claimed in claim 10, wherein the downstream support roller is selectively pivotable between a lowered position and a raised position.

14. The bale wrapping apparatus as claimed in claim 10, wherein the bale wrapping support assembly further comprises an intermediate support roller movable between a lowered configuration where it is disengaged from a peripheral surface of the bale and a raised configuration where it is engaged with the peripheral surface of the bale, between the upstream support roller and the downstream support roller.

15. The bale wrapping apparatus as claimed in claim 9, wherein the longitudinal bale support comprises at least two elongated members extending longitudinally along the longitudinal axis.

16. The bale wrapping apparatus as claimed in claim 15, wherein the at least two elongated members are pivotable between an inclined orientation and a substantially horizontal orientation, the at least two elongated members being positioned in the substantially horizontal orientation when the longitudinal bale support is configured in the extended configuration and being positioned in the inclined orientation when the longitudinal bale support is configured in the retracted configuration.

17. The bale wrapping apparatus as claimed in claim 9, wherein the bale loading support structure comprises a bale biasing member movable substantially parallel to the longitudinal axis to push a bale towards the wrapping section.

18. The bale wrapping apparatus as claimed in claim 17, wherein the bale biasing member comprises a roller extending substantially transversally with respect to the longitudinal axis, the roller being rotatable and engageable with the bale to drive the bale in rotation towards the wrapping section when the bale wrapping apparatus is configured in the single bale wrapping configuration.

* * * * *